United States Patent
Kumano

(10) Patent No.: US 10,606,601 B2
(45) Date of Patent: Mar. 31, 2020

(54) METHOD, SYSTEM AND NON-TRANSITORY COMPUTER-READABLE STORAGE MEDIUM FOR ANALYZING ACCESS TO STORAGE DEVICE

(71) Applicant: FUJITSU LIMITED, Kawasaki-shi, Kanagawa (JP)

(72) Inventor: Tatsuo Kumano, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/879,492

(22) Filed: Jan. 25, 2018

(65) Prior Publication Data

US 2018/0225122 A1 Aug. 9, 2018

(30) Foreign Application Priority Data

Feb. 3, 2017 (JP) .................................. 2017-018702

(51) Int. Cl.
  *G06F 9/38* (2018.01)
  *G06F 12/0862* (2016.01)
  *G06F 12/0866* (2016.01)
  *G06F 3/06* (2006.01)

(52) U.S. Cl.
  CPC ............ *G06F 9/3832* (2013.01); *G06F 3/061* (2013.01); *G06F 3/0653* (2013.01); *G06F 3/0659* (2013.01); *G06F 3/0685* (2013.01); *G06F 12/0862* (2013.01); *G06F 12/0866* (2013.01); *G06F 3/0688* (2013.01); *G06F 2212/312* (2013.01); *G06F 2212/604* (2013.01)

(58) Field of Classification Search
  None
  See application file for complete search history.

(56) References Cited

U.S. PATENT DOCUMENTS

| | | | |
|---|---|---|---|
| 2002/0103965 A1* | 8/2002 | Dawkins | G06F 12/122 711/113 |
| 2003/0208660 A1* | 11/2003 | van de Waerdt | G06F 12/0862 711/137 |
| 2004/0088504 A1* | 5/2004 | Hsu | G06F 3/0613 711/158 |
| 2006/0174024 A1* | 8/2006 | Chi | G06F 16/24568 709/231 |
| 2008/0140997 A1* | 6/2008 | Tripathi | G06F 12/0862 712/207 |

(Continued)

FOREIGN PATENT DOCUMENTS

| | | |
|---|---|---|
| JP | 2003-167781 | 6/2003 |
| JP | 2006-260067 | 9/2006 |
| JP | 2015-219926 | 12/2015 |

*Primary Examiner* — J. H. Hur
(74) *Attorney, Agent, or Firm* — Fujitsu Patent Center

(57) ABSTRACT

A method performed by a computer for analyzing access to a storage device, the method includes: executing a calculating process that includes calculating, for each of a plurality of ranges obtained by dividing a storage area of the storage device, an access number or a variation of the access number in each of a plurality of periods, wherein the access number indicates the number of times of access to each of the plurality of ranges; and executing a determining process that includes determining a correlation between any two of the plurality of ranges in accordance with the access number or the variation of the access number for each period in each of the plurality of ranges.

6 Claims, 36 Drawing Sheets

(56) References Cited

U.S. PATENT DOCUMENTS

2008/0301399 A1 12/2008 Yasue et al.
2011/0238922 A1* 9/2011 Hooker ............... G06F 12/0862
                                                    711/137
2015/0339235 A1 11/2015 Jung et al.

* cited by examiner

FIG. 7

| RANGE ID | LBA RANGE (GiB) |
|---|---|
| $E_1$ | 0 OR LARGER AND SMALLER THAN 1 |
| $E_2$ | 1 OR LARGER AND SMALLER THAN 2 |
| $E_3$ | 2 OR LARGER AND SMALLER THAN 3 |
| ⋮ | ⋮ |
| $E_{1000}$ | 999 OR LARGER AND SMALLER THAN 1000 |

FIG. 8

| PERIOD ID | PERIOD |
|---|---|
| $P_1$ | 00:00:00 TO IMMEDIATELY BEFORE 00:01:00 |
| $P_2$ | 00:01:00 TO IMMEDIATELY BEFORE 00:02:00 |
| $P_3$ | 00:02:00 TO IMMEDIATELY BEFORE 00:03:00 |
| ⋮ | ⋮ |
| $P_{1440}$ | 23:59:00 TO IMMEDIATELY BEFORE 24:00:00 |

FIG. 10

| ACQUIRED DATE AND TIME | LBA |
|---|---|
| 2017/01/01 00:00:01:00 | $L_1$ |
| 2017/01/01 00:00:02:00 | $L_2$ |
| ⋮ | ⋮ |
| 2017/01/01 23:59:59:00 | $L_N$ |

FIG. 12

| RANGE ID | PERIOD ID | | | | |
|---|---|---|---|---|---|
| | $P_1$ | $P_2$ | $P_3$ | $\cdots$ | $P_{1440}$ |
| $E_1$ | $A_{1\_1}$ | $A_{1\_2}$ | $A_{1\_3}$ | $\cdots$ | $A_{1\_1440}$ |
| $E_2$ | $A_{2\_1}$ | $A_{2\_2}$ | $A_{2\_3}$ | $\cdots$ | $A_{2\_1440}$ |
| $E_3$ | $A_{3\_1}$ | $A_{3\_2}$ | $A_{3\_3}$ | $\cdots$ | $A_{3\_1440}$ |
| $\vdots$ | $\vdots$ | $\vdots$ | $\vdots$ | $\vdots$ | $\vdots$ |
| $E_{1000}$ | $A_{1000\_1}$ | $A_{1000\_2}$ | $A_{1000\_3}$ | $\cdots$ | $A_{1000\_1440}$ |

FIG. 14

| RANGE ID | GROUP ID |
|----------|----------|
| $E_1$ | $G_1$ |
| $E_2$ | $G_2$ |
| $E_3$ | $G_3$ |
| ⋮ | ⋮ |
| $E_{1000}$ | $G_1$ |

FIG. 16

| RANGE ID | PERIOD ID | | | | |
|---|---|---|---|---|---|
| | $P_1$ | $P_2$ | $P_3$ | $\cdots$ | $P_{1440}$ |
| $E_1$ | $B_{1\_1}$ | $B_{1\_2}$ | $B_{1\_3}$ | $\cdots$ | $B_{1\_1440}$ |
| $E_2$ | $B_{2\_1}$ | $B_{2\_2}$ | $B_{2\_3}$ | $\cdots$ | $B_{2\_1440}$ |
| $E_3$ | $B_{3\_1}$ | $B_{3\_2}$ | $B_{3\_3}$ | $\cdots$ | $B_{3\_1440}$ |
| $\vdots$ | $\vdots$ | $\vdots$ | $\vdots$ | $\vdots$ | $\vdots$ |
| $E_{1000}$ | $B_{1000\_1}$ | $B_{1000\_2}$ | $B_{1000\_3}$ | $\cdots$ | $B_{1000\_1440}$ |

FIG. 24

| ACCESS DATE AND TIME | RANGE ID |
|---|---|
| $T_1$ | $E_2$ |
| $T_2$ | $E_1$ |
| $T_3$ | $E_3$ |
| ⋮ | ⋮ |
| $T_M$ | $E_2$ |

METHOD, SYSTEM AND NON-TRANSITORY COMPUTER-READABLE STORAGE MEDIUM FOR ANALYZING ACCESS TO STORAGE DEVICE

CROSS-REFERENCE TO RELATED APPLICATION

This application is based upon and claims the benefit of priority of the prior Japanese Patent Application No. 2017-018702, filed on Feb. 3, 2017, the entire contents of which are incorporated herein by reference.

FIELD

The embodiments discussed herein are related to a technology to analyze access to a storage device.

BACKGROUND

Storage systems using a solid state drive (SSD) and a hard disk drive (HDD) in combination as an auxiliary storage, for example, increase processing performance by effectively using the SSD with a low latency and achieve cost reduction by using an inexpensive HDD to secure a large capacity.

In such a storage system, storage hierarchy control is often performed. For example, in a lower layer, a pool for the SSD and a pool for the HDD are managed, while in an upper layer, an overall logical storage area is controlled. The storage hierarchy control improves the performance appropriately by allocating data with a high access frequency to the SSD.

In related art, it is attempted to improve the processing performance of the storage hierarchy control by predicting a range to be accessed. For example, preloading based on static patterns of pieces of data that have accessed at the same time is proposed.

Examples of the related art include Japanese Laid-open Patent Publication Nos. 2015-219926, 2006-260067, and 2003-167781.

SUMMARY

According to an aspect of the invention, a method performed by a computer for analyzing access to a storage device, the method includes: executing, by a processor of the computer, a calculating process that includes calculating, for each of a plurality of ranges obtained by dividing a storage area of the storage device, an access number or a variation of the access number in each of a plurality of periods, wherein the access number indicates the number of times of access to each of the plurality of ranges; and executing, by the processor of the computer, a determining process that includes determining a correlation between any two of the plurality of ranges in accordance with the access number or the variation of the access number for each period in each of the plurality of ranges.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a diagram illustrating an example range table;
FIG. 8 is a diagram illustrating an example period table;
FIG. 10 is a diagram illustrating an example sample table;
FIG. 12 is a diagram illustrating an example first vector table;
FIG. 14 is a diagram illustrating an example group table;
FIG. 16 is a diagram illustrating an example second vector table;
FIG. 24 is a diagram illustrating an example log table.

DESCRIPTION OF EMBODIMENTS

In the related art described above, appropriate prediction of a range to be preloaded is difficult. According to an aspect of the present disclosure, provided are technologies for making it easier to predict a range to be accessed close in time to another range in a storage area.

Embodiment 1

Figure 1:
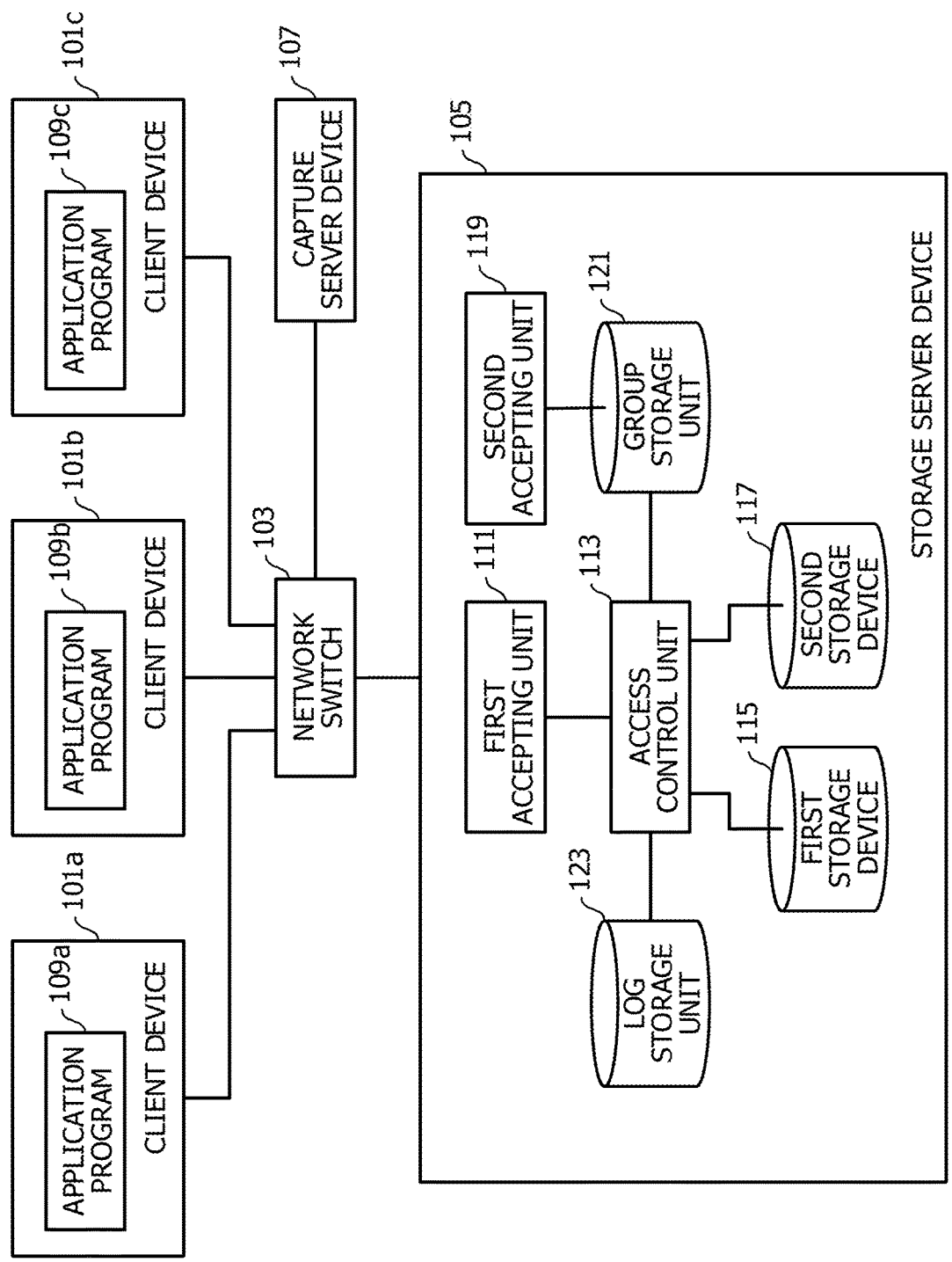
FIG. 1 is a diagram illustrating an example system configuration.

FIG. 1 illustrates an example system configuration. Client devices 101a to 101c are connected with a storage server device 105 via a network switch 103. The storage server device 105 manages data used by application programs 109a to 109c that run on the client devices 101a to 101c. The storage server device 105 receives an I/O request sent from the client devices 101a to 101c via the network switch 103. Specifically, a packet with a read command or a write command set is transmitted. Hereinafter, the read command and the write command are referred to as an access command. Note that the number of the client devices 101 included in the system may be one. The number of the application programs 109 running on the client device 101 may be more than one.

The network switch 103 is connected to a capture server device 107. The capture server device 107 uses a port mirroring function running on the network switch 103 and captures a packet to be transmitted to the storage server device 105 from the network switch 103. The captured packet is then analyzed. In the analysis, a group table is generated, and the group table is sent to the storage server device 105. Details of the analysis and the group table will be described later.

The storage server device 105 includes a plurality of storage devices. In this example, the storage server device 105 includes a first storage device 115 and a second storage device 117. The first storage device 115 is an SSD, for example. The second storage device 117 is an HDD, for example. The SSD has a lower latency but more expensive than the HDD. The storage device is not limited to the SSD and the HDD.

Here, an example in which the first storage device 115 and the second storage device 117 are included in the storage server device 105 is illustrated. However, the first storage device 115 and the second storage device 117 may be provided outside the storage server device 105. Moreover, three or more storage devices may be controlled.

A first accepting unit 111 accepts an access command and transfers the access command to an access control unit 113.

The access control unit 113 performs storage hierarchy control, in which a pool for the SSD and a pool for the HDD are managed in a lower layer. These pools in the lower layer correspond to an internal, logical storage area. The access control unit 113 also manages a pool in a higher layer linked to the pools in the lower layer. The pool in the higher layer also corresponds to a logical storage area, while corresponding to a logical address for an interface of the storage server device 105. The logical address for the interface of the storage server device 105 is, for example, a logical block addressing (LBA). The LBA corresponds to a virtual sector number. Data corresponding to a transfer unit is assigned to the virtual sector. The transfer unit is used to manage data internally. The transfer unit with a low access frequency is managed by the pool of the second storage device 117, while the transfer unit with a high access frequency is managed by the pool of the first storage device 115. This processing is automatically performed based on an allocation policy, for example. Note that the logical address for the interface of the storage server device 105 may not be limited to the LBA.

The access control unit 113 performs preloading. When a preloading target is the transfer unit identified by the LBA and the transfer unit is managed by the pool of the second storage device 117, this management of the transfer unit is transferred so as to be performed by the pool of the first storage device 115. At this time, this transfer unit is transferred from the second storage device 117 to the first storage device 115. When the transfer unit is already managed by the pool of the first storage device 115, the transfer unit is not transferred.

A second accepting unit 119 accepts a group table output from the capture server device 107. A group storage unit 121 stores therein the accepted group table. In this embodiment, the access control unit 113 uses the group table in preloading. A use method of the group table will be described later.

The storage server device 105 includes a log storage unit 123. The log storage unit 123 stores therein a log table. The log table will be described later with reference to FIG. 24.

The first accepting unit 111, the access control unit 113, and the second accepting unit 119, which are mentioned above, are implemented using hardware resources (FIG. 36, for example) and a program that causes a processor to execute the later-described processing.

Figure 36:
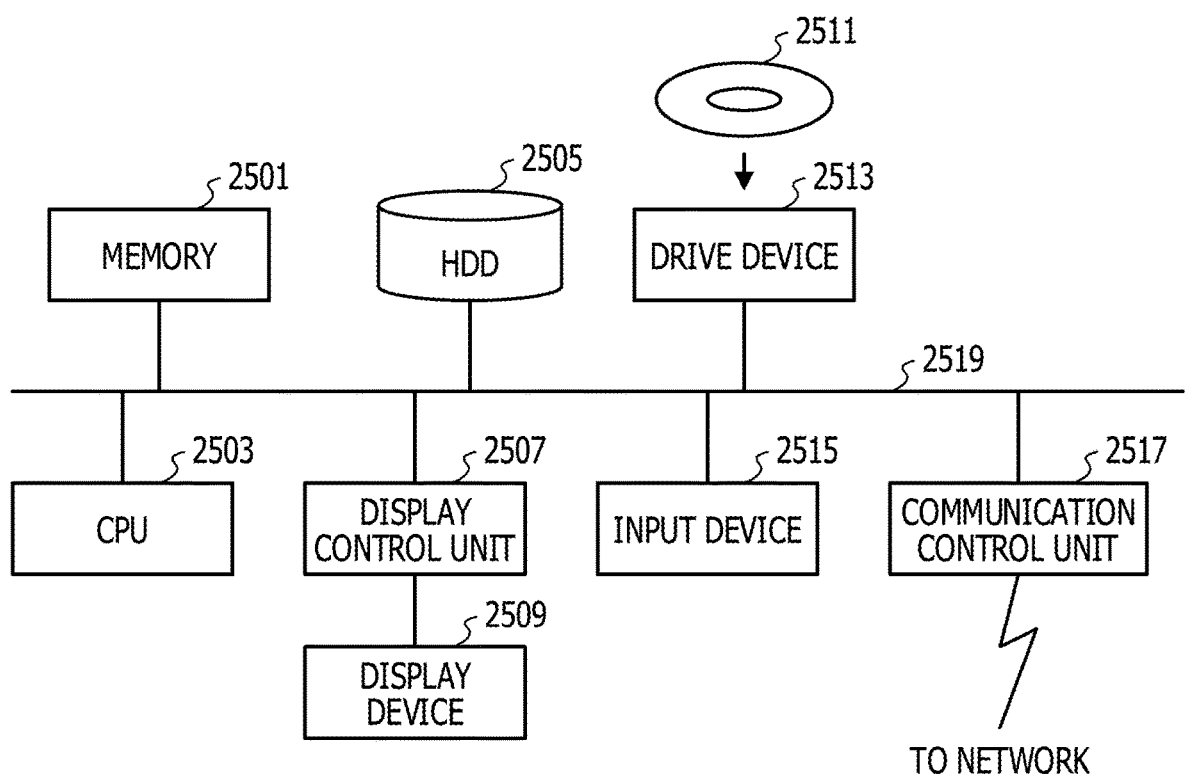
FIG. 36 is a functional block diagram of a computer.

The group storage unit 121 and the log storage unit 123, which are mentioned above, are implemented using hardware resources (FIG. 36, for example).

Figure 2:
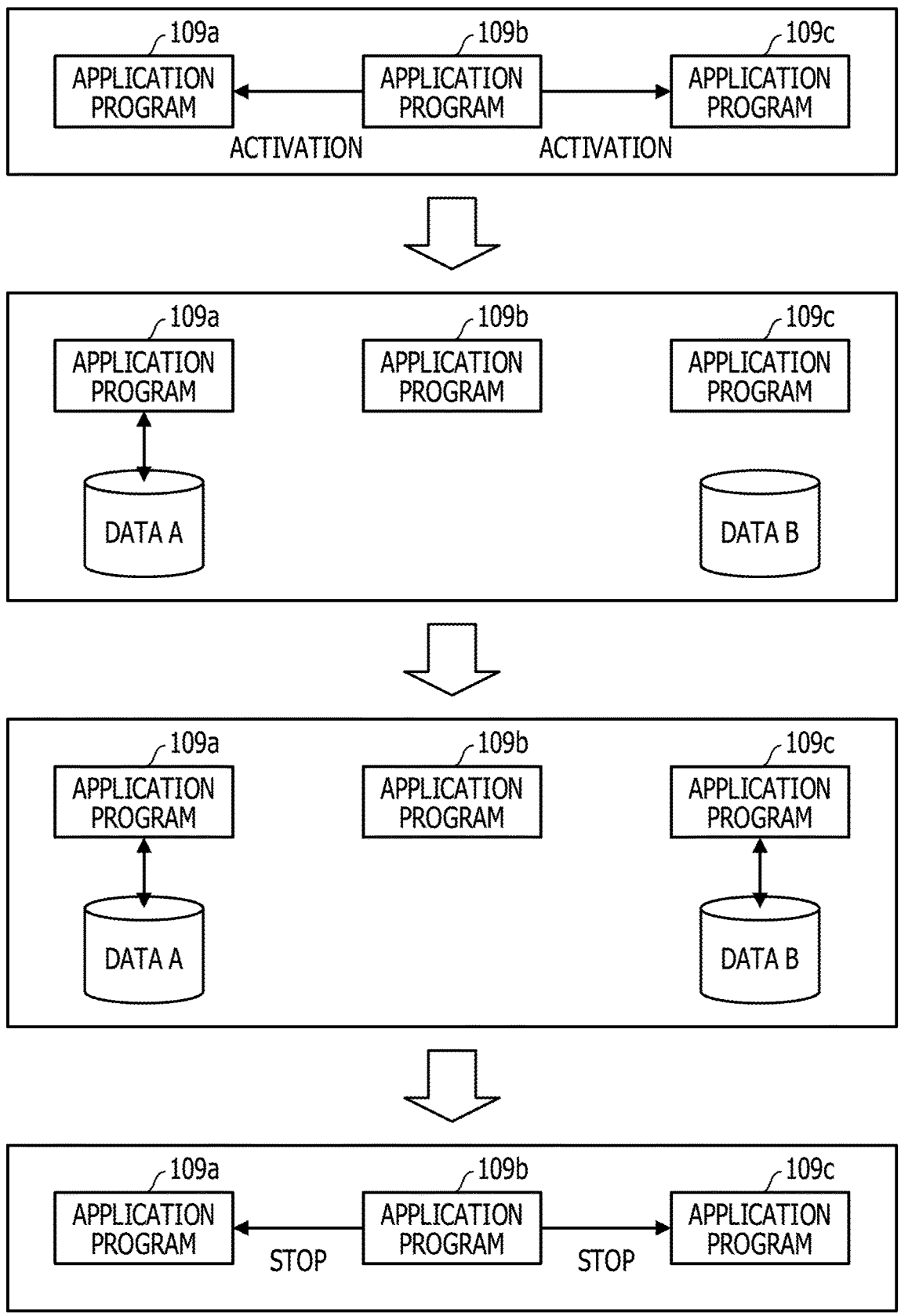
FIG. 2 is a diagram illustrating an example operation of application programs.

An example operation of the application program 109 will now be provided. An example operation illustrated in FIG. 2 is firstly described. As illustrated in the first stage, the application program 109b activates the application program 109a and the application program 109c at a certain timing.

As illustrated in the second stage, the started application program 109a reads data A managed by the storage server device 105, updates the data A, and repeats these processes. At this point of time, the application program 109c is not yet started.

With delay of 10 seconds thereafter, the application program 109c is started, as illustrated in the third stage. The application program 109c then reads data B managed by the storage server device 105, updates the data B, and repeats these processes.

After the state illustrated in the third stage continues for a while, the application program 109a and the application program 109c are stopped at a certain timing, as illustrated in the fourth stage. Thereafter, the processes of reading and updating the data A and the data B are not performed.

In this example, if the storage server device 105 internally preloads the data B when the application program 109a reads the data A, actual time for the application program 109c to read the data B is shortened.

Figure 3:
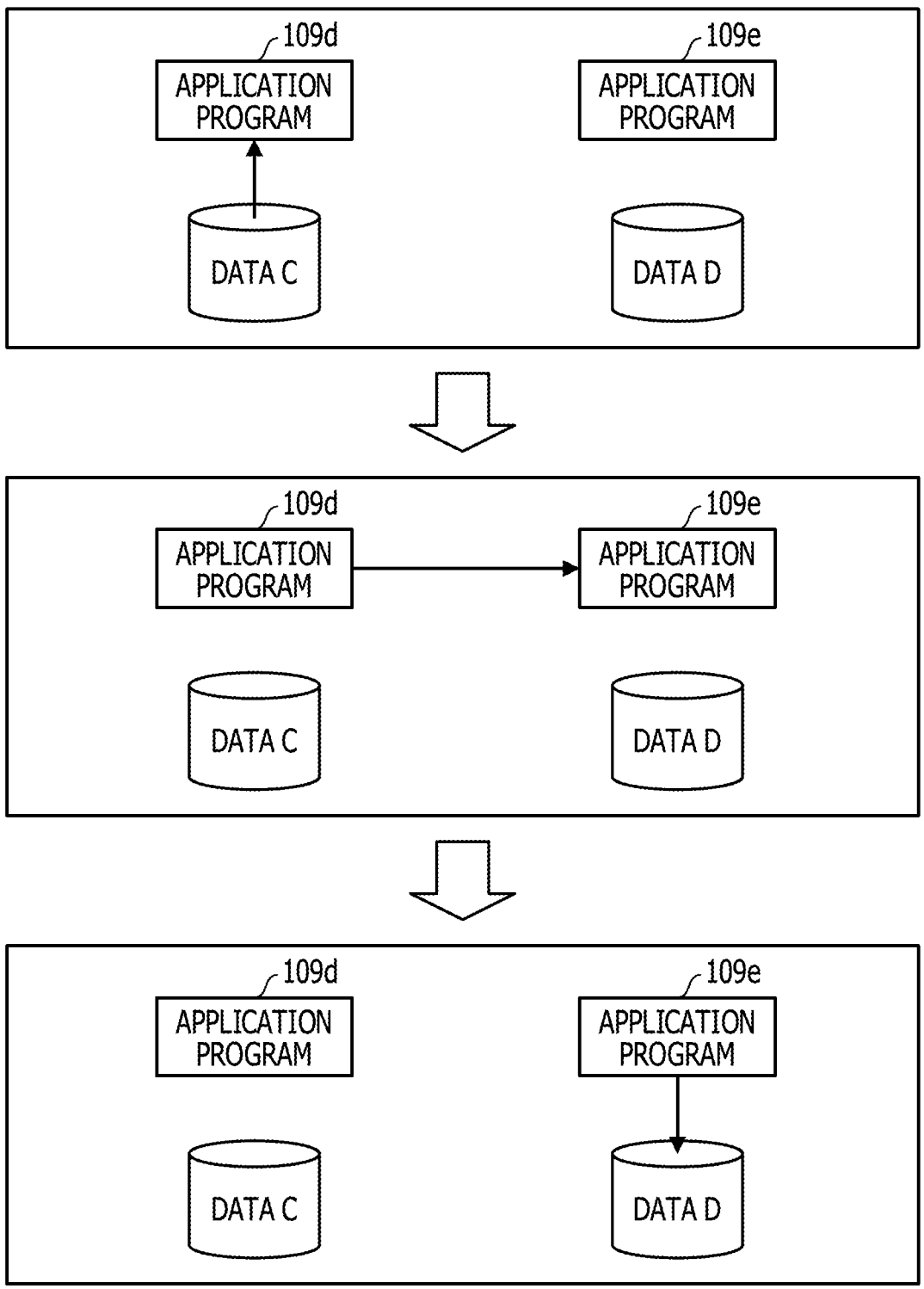
FIG. 3 is a diagram illustrating an example operation of application programs.

FIG. 3 illustrates another example operation. As illustrated in the first stage, an application program 109d reads data C and executes processing for the data C. The application program 109d then passes a processing result to an application program 109e, as illustrated in the second stage. The application program 109e that has received the processing result updates data D based on the processing result. Time from when the application program 109d reads the data C to when the application program 109e updates the data D is roughly five seconds. The processing of the first to third stages is repeated several times.

In this example, if the storage server device 105 internally preloads the data D when the application program 109d reads the data C, actual time for the application program 109e to update the data D is shortened.

Figure 4:
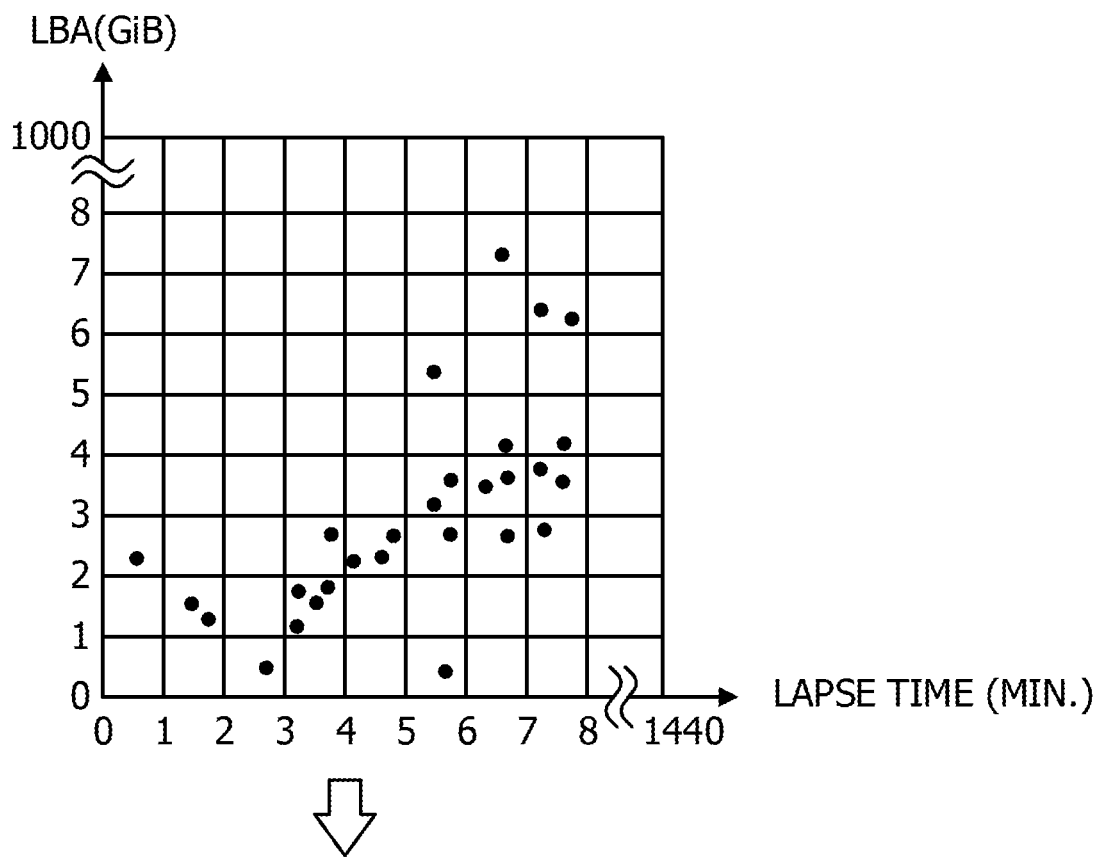
FIG. 4 is a diagram illustrating an overview of access number vectors.

This embodiment focuses on pieces of access likely to occur close in time. To this end, access number vectors are generated. Next, outline of the access number vector is described using FIG. 4.

In the graph on the upper side, the ordinate indicates the LBA and the abscissa indicates lapse time. The LBA is divided into ranges (sometimes called an extent) of 1 GiB. The number of ranges is 1000. The lapse time across 24 hours is divided into a period of one minute. The number of periods is 1440.

One dot corresponds to a single-time access and indicates the LBA that has been accessed and a timing at which access has been made. For example, it is illustrated that access that has made by an LBA and falls in a range from 2 GiB or more and less than 3 GiB occurs once during the period between the start of measurement and a lapse of one minute.

The lower side of the diagram indicates examples of the access number vector corresponding to the graph. The access number vector is provided for each range and contains an element corresponding to each period. A value of the element indicates the number of times the access has been made by an LBA in each period and each range. Taking the access number vector in the third range as an example, the number of times of the access made by the LBA and falling in the range of 2 GiB or more and less than 3 GiB corresponds to the value of the element.

Ranges in which the access occurs a similar number of times and close in time have analogous access number vectors. In the example operation in FIG. 2, the access made by the application program 109a and the access made by the application program 109c occur frequently during the operations of the application program 109a and the application program 109c. Thus, the values of the elements in the periods for which the application program 109a and the application program 109c are in operation are large also in the access number vector in the range containing the LBA for reading the data A and the access number vector in the range containing the LBA for reading the data B. Meanwhile, during the period when the application program 109a and the application program 109c are stopped, no access is made by the application program 109a and the application program 109c. Thus, the values of the elements in the periods for which the application program 109a and the application program 109c are stopped are small also in the access number vector in the range containing the LBA for reading the data A and the access number vector in the range containing the LBA for reading the data B.

In the example operation in FIG. 3, the point of time when the application program 109d reads the data C and the point of time when the application program 109e updates the data D are contained in the same period with a high possibility. Moreover, the number of times of reading and the number of times of updating coincide with each other. Thus, the access number vector in the range containing the LBA for reading the data C and the access number vector in the range containing the LBA for updating the data D are analogous.

In the example operations in FIGS. 2 and 3, accidental access or steady access occurs along with the access made by the application program, in some cases. However, the timing at which these types of access occur is irrelevant to the access made by the application programs 109a to 109e, and therefore, these types of access do not affect a characteristic indicating a correlation between the access number vectors.

In this embodiment, the ranges are grouped by performing clustering on the access number vectors. The ranges made into a group by clustering on the access number vectors have a correlation. That is, access timings of the LBA in the ranges falling in the same group are likely to be concentrated.

Figure 5:
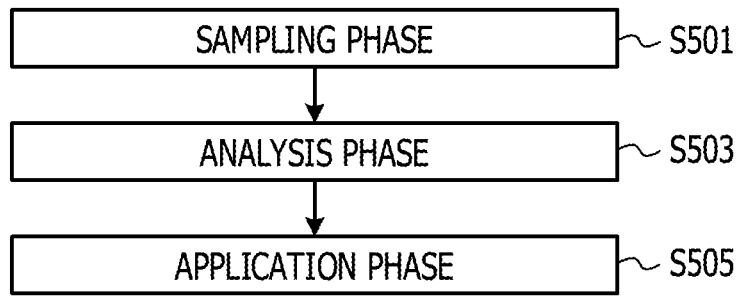
FIG. 5 is a diagram illustrating phases.

Next, phases in the embodiment are described using FIG. 5. In a sampling phase coming first, a packet is captured by the capture server device 107, and a sample that is a set of the date and time when a packet related to an access command is acquired and the LBA of the access command is collected (S501).

In an analysis phase following the sampling phase, based on the sample, ranges are grouped by performing clustering on the access number vectors in the capture server device 107 (S503).

In an application phase coming last, the result of grouping is used in the storage server device 105 and preloading is performed (S505). The description of the outline of this embodiment has thus been provided.

Figure 6:
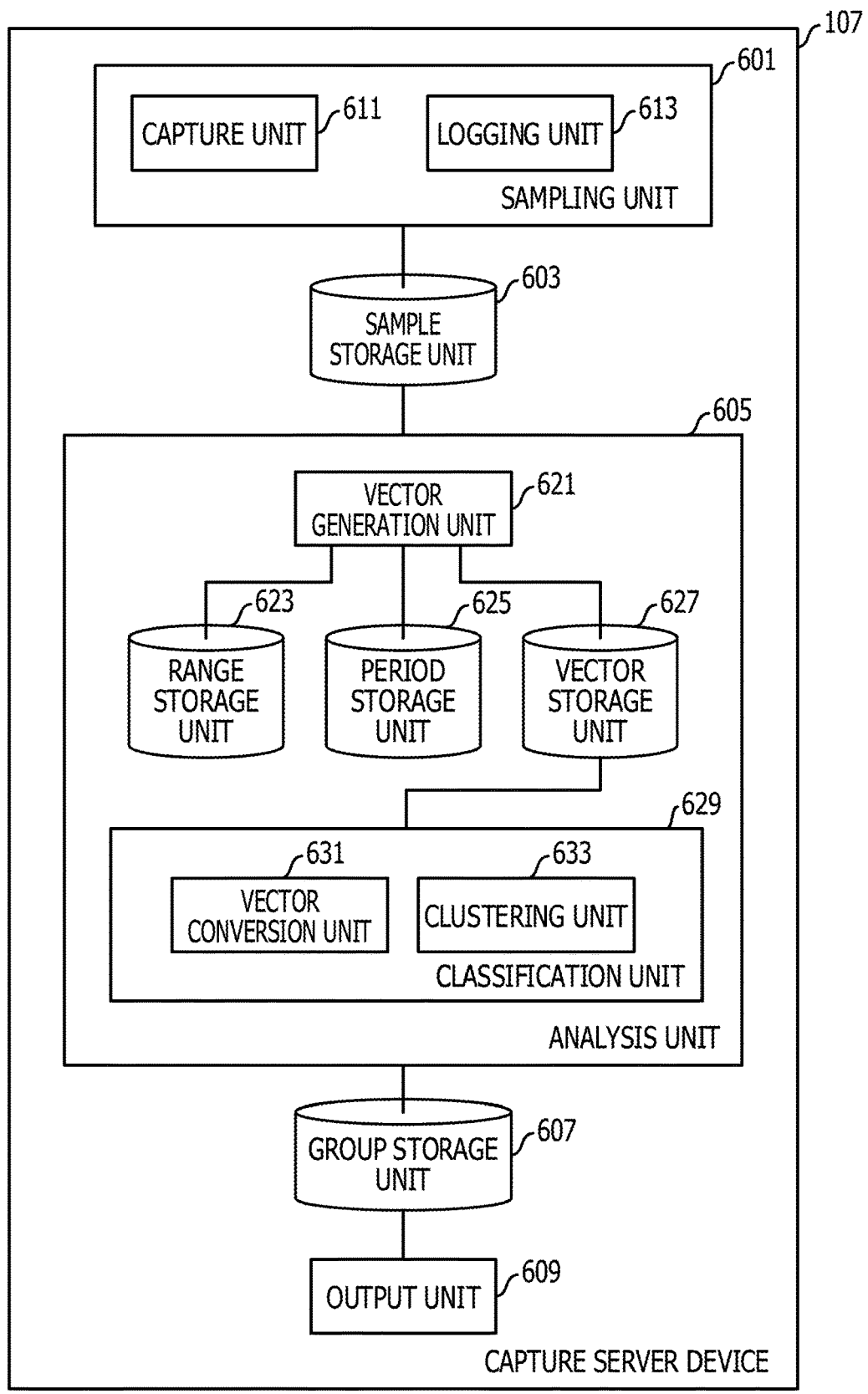
FIG. 6 is a diagram illustrating an example module configuration of a capture server device.

An operation of the capture server device 107 will now be described. FIG. 6 illustrates an example module configuration of the capture server device 107. The capture server device 107 includes a sampling unit 601, a sample storage unit 603, an analysis unit 605, a group storage unit 607, and an output unit 609.

The sampling unit 601 captures a packet and collects a sample that is a set of the date and time when a packet related to an access command is acquired and the LBA of the access command. The sample storage unit 603 stores therein a sample table. The sample table will be described later using FIG. 10. The analysis unit 605 analyzes the sample and groups ranges by performing clustering on the access number vectors. The group storage unit 607 stores therein a group table. The group table will be described later using FIG. 14. The output unit 609 outputs the group table.

The sampling unit 601 has a capture unit 611 and a logging unit 613. The capture unit 611 captures a packet to be transmitted to the storage server device 105 from the network switch 103. The logging unit 613 generates the sample table.

The analysis unit 605 has a vector generation unit 621, a range storage unit 623, a period storage unit 625, a vector storage unit 627, and a classification unit 629. The vector generation unit 621 generates an access number vector for each range. In an embodiment described later, the vector generation unit 621 generates a variation vector of the access number, for each range.

The range storage unit 623 stores therein a range table. The range table will be described later using FIG. 7. The period storage unit 625 stores therein a period table. The period table will be described later using FIG. 8. The vector storage unit 627 stores therein a first vector table and a second vector table. The first vector table will be described later using FIG. 12. The second vector table will be described later using FIG. 16.

The classification unit 629 classifies the ranges. The classification unit 629 has a vector conversion unit 631 and a clustering unit 633. The vector conversion unit 631 converts the access number vector to the variation vector. The clustering unit 633 performs clustering on the access number vector and the variation vector.

The sampling unit 601, the analysis unit 605, the output unit 609, the capture unit 611, the logging unit 613, the vector generation unit 621, the classification unit 629, the vector conversion unit 631, and the clustering unit 633, which are mentioned above, are implemented using hardware resources (FIG. 36, for example) and a program that causes a processor to execute the later-described processing.

The sample storage unit 603, the group storage unit 607, the range storage unit 623, the period storage unit 625, and the vector storage unit 627, which are mentioned above, are implemented using hardware resources (FIG. 36, for example).

FIG. 7 illustrates an example range table. The range table in this example contains a record corresponding to the range. The record of the range table has a field in which a range ID is set and a field in which an LBA range is set.

The range ID identifies the range. The LBA range is defined by sectioning the storage area. In this example, the size of the LBA range is 1 GiB. The first record illustrated in FIG. 7 indicates that a range ID: $E_1$ identifies a range from 0 GiB or more and less than 1 GiB of the LBA.

FIG. 8 illustrates an example period table. The period table in this example contains a record corresponding to the period. The record of the period table has a field in which a period ID is set and a field in which a period is set.

The period ID identifies the period. The length of the period in this example is one minute. The first record illustrated in FIG. 8 indicates that a period ID: $P_1$ identifies a period after 00:00:00 and immediately before 00:01:00.

Figure 9:
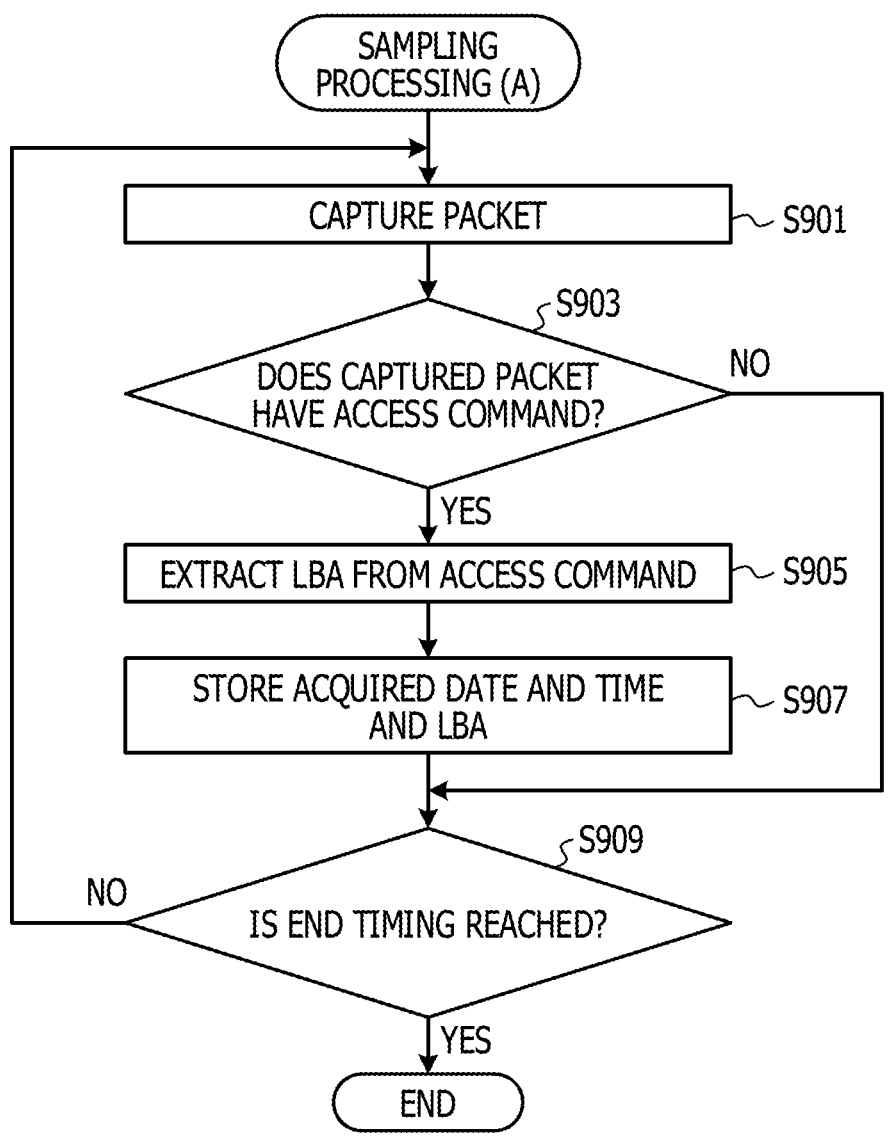
FIG. 9 is a diagram illustrating a flow of sampling processing (A)

Next, processing of the sampling phase is described. In this embodiment, sampling processing (A) is performed. FIG. 9 illustrates a flow of the sampling processing (A). The capture unit 611 captures a packet to be transmitted to the storage server device 105 (S901). The logging unit 613 determines whether the captured packet has an access command (S903). If it is determined that the captured packet does not have an access command, the process proceeds to S909.

On the other hand, if determining that the captured packet has an access command, the logging unit 613 extracts an LBA from the access command (S905). The logging unit 613 stores the acquired date and time and the LBA in a new record of the sample table (S907).

FIG. 10 illustrates an example of the sample table. The sample table in this example contains a record corresponding to the access command. The record of the sample table has a field in which the acquired date and time is stored and a field in which the LBA is stored.

The acquired date and time identifies a timing at which the access command is acquired. The LBA identifies an area in which access is made. The first record illustrated in FIG. 10 indicates that the access command for an LBA: $L_1$ has been acquired at 00:00:01.00 on Jan. 1, 2017.

Referring back to the description of FIG. 9, the logging unit 613 determines whether an end timing is reached (S909). If it is determined that the end timing is not reached, the process returns to S901 and the above-mentioned processing is repeated. On the other hand, if it is determined that the end timing is reached, the sampling processing (A) ends.

Figure 11:
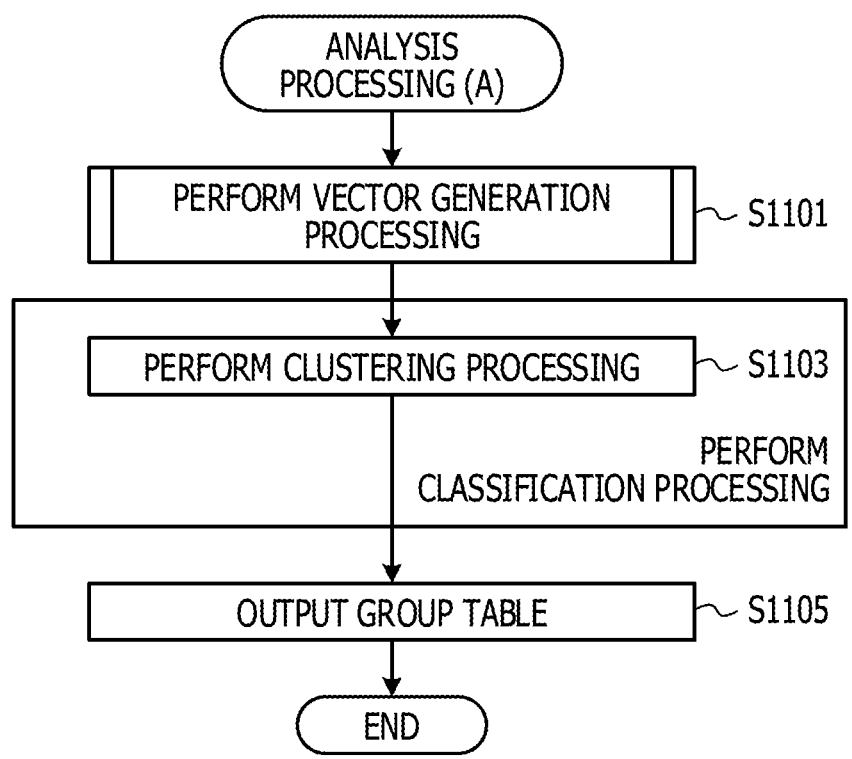
FIG. 11 is a diagram illustrating a flow of analysis processing (A)

Next, processing of the analysis phase is described. In this embodiment, analysis processing (A) is performed. FIG. 11 illustrates a flow of the analysis processing (A). The vector generation unit 621 performs vector generation processing (S1101).

In the vector generation processing of this embodiment, the access number vector for each range is generated. The access number vector is set in the first vector table.

FIG. 12 illustrates an example of the first vector table. The first vector table contains a record corresponding to the range. The record of the first vector table has a field in which the range ID is stored and a field in which the access number in each period ID is stored.

The range ID identifies a range in which the access number is counted. The first record illustrated in FIG. 12 indicates that in a period identified by the period ID: $P_1$, for example, $A_{1\_1}$ times of access occurred in a range identified by the range ID: $E_1$.

Figure 13:
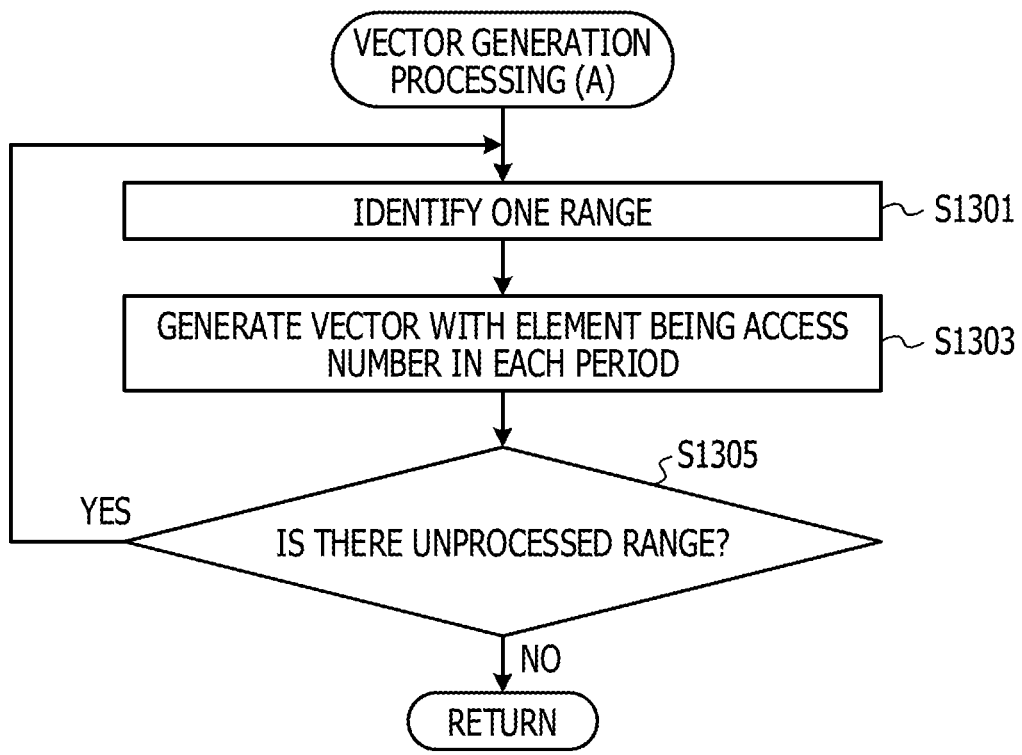
FIG. 13 is a diagram illustrating a flow of vector generation processing (A)

Vector generation processing (A) in the embodiment is described in detail using FIG. 13. The vector generation unit 621 identifies one range (S1301). For example, the vector generation unit 621 identifies the range ID one at a time in ascending order.

The vector generation unit 621 generates a vector with an element being the number of times the access has been made in the range for each period (S1303).

The vector generation unit 621 determines whether there is an unprocessed range (S1305). If it is determined that there is an unprocessed range, the process returns to S1301 and the above-mentioned processing is repeated. On the other hand, if it is determined that there is no unprocessed range, the vector generation processing (A) ends. Then, the process goes back to the analysis processing (A), which is a caller.

Referring back to the description of FIG. 11, the clustering unit 633 performs clustering processing (S1103). In the clustering processing, clustering is performed on the access number vectors to divide the ranges into a strongly correlated group. At this time, hierarchical clustering may be performed or non-hierarchical clustering may be performed. These types of clustering are the same as those of the related art and the detailed description is omitted. Note that the clustering processing of this embodiment corresponds to classification processing performed by the classification unit 629.

Figure 14:
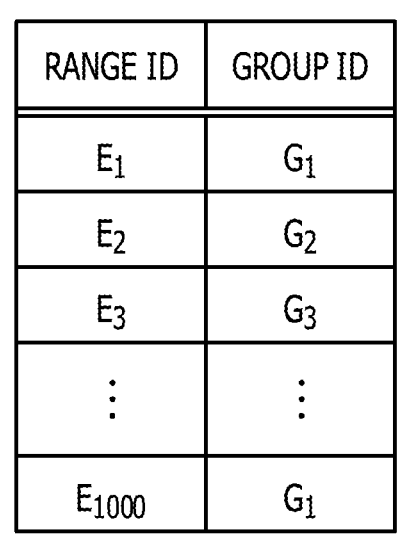

As a result of the clustering processing, the group table is generated. FIG. 14 illustrates an example of the group table. The group table in this example contains a record corresponding to the range. The record of the group table has a field in which the range ID is stored and a field in which a group ID is stored.

The range ID identifies a range to be classified. The group ID identifies a group to which the range belongs. The first record illustrated in FIG. 14 indicates that the range of the range ID: $E_1$ belongs to a group of a group ID: $G_1$.

Referring back to the description of FIG. 11, the output unit 609 outputs the group table (S1105). In this example, the output unit 609 transmits the group table to the storage server device 105. The analysis processing (A) then ends. Alternatively, the group table may be passed to the storage server device 105 via a storage medium.

Figure 15:
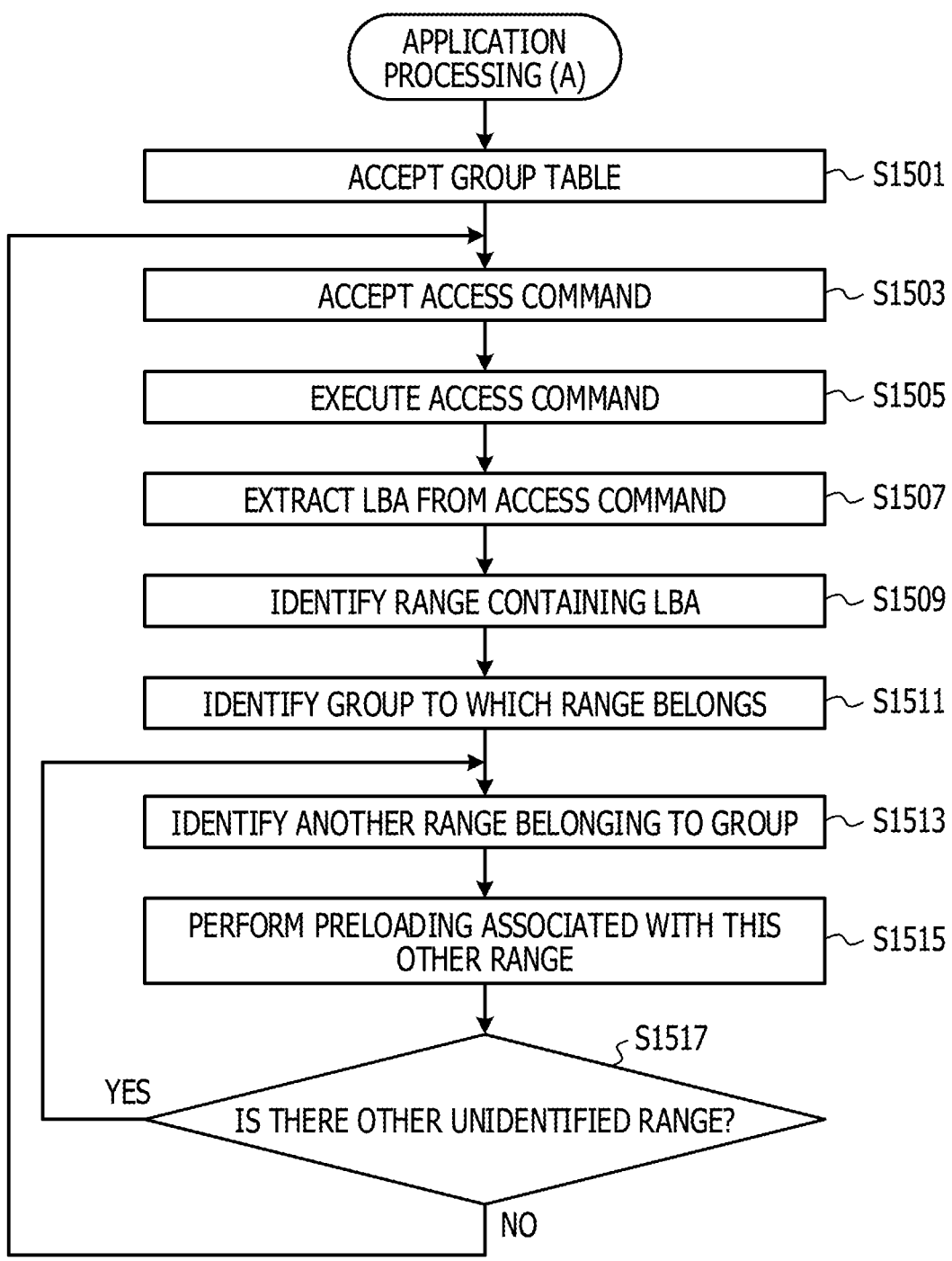
FIG. 15 is a diagram illustrating a flow of application processing (A)

Lastly, processing of the application phase is described. In this embodiment, application processing (A) is performed. FIG. 15 illustrates a flow of the application processing (A). The second accepting unit 119 accepts a group table from the capture server device 107 (S1501). If a group table is accepted from the capture server device 107 before the application phase starts, the processing of S1501 may be omitted. The group table is stored in the group storage unit 121.

The first accepting unit 111 accepts an access command (S1503), and then, the access control unit 113 executes the accepted access command (S1505). When the access command is a read command, data is read from the area identified by the LBA and transmitted to the client device 101 that has made an I/O request. When the access command is a write command, data received from the client device 101 that has made an I/O request is written to the area identified by the LBA.

The access control unit 113 extracts an LBA from the executed access command (S1507). The access control unit 113 identifies the range containing the LBA based on the range table (S1509). The access control unit 113 identifies a group to which the range belongs, based on the group table (S1511).

The access control unit 113 identifies another range belonging to this group based on the group table (S1513). The access control unit 113 performs preloading associated with this other range (S1515).

When each LBA contained in this other range identifies a transfer unit and the transfer unit is managed by the pool of the second storage device 117, this management of the transfer unit is transferred so as to be performed by the pool of the first storage device 115. At this time, this transfer unit is transferred from the second storage device 117 to the first storage device 115. If the transfer unit is already managed by the pool of the first storage device 115, the transfer unit is not transferred.

The access control unit 113 determines whether there is other unidentified range (S1517). If it is determined that there is other unidentified range, the process returns to S1513 and the above-mentioned processing is repeated. On the other hand, if it is determined that there is no unidentified range, the process returns to S1503 and the above-mentioned processing is repeated.

According to this embodiment, it is easier to predict a range to be accessed close in time to another range in the storage area.

Moreover, the clustering of the vectors each with the element being the number of times of access makes it easier to identify a correlated range.

Furthermore, the range to be preloaded is identified based on the group, so that resources are effectively used with ease.

Embodiment 2

The above-mentioned embodiment describes the example of generating the vector with the element being the number of times of access. Embodiment 2 describes an example of generating a vector with an element being a variation in the number of times of access.

The vector with an element being a variation in the number of times of access is set in the second vector table. FIG. 16 illustrates an example of the second vector table. The second vector table contains a record corresponding to the range. The record of the second vector table has a field in which the range ID is stored and a field in which the variation of the access number in each period ID is stored.

The variation of the access number indicates a value obtained by subtracting the access number immediately before a period from the access number in the period. For example, a variation $B_{1\_2}$ in the range identified by the range ID: $E_1$ and in a period identified by a period ID: $P_2$ is a value obtained by subtracting the access number in the range $E_1$ and in the period $P_1$ from the access number in the range $E_1$ and the period $P_2$.

Figure 17:
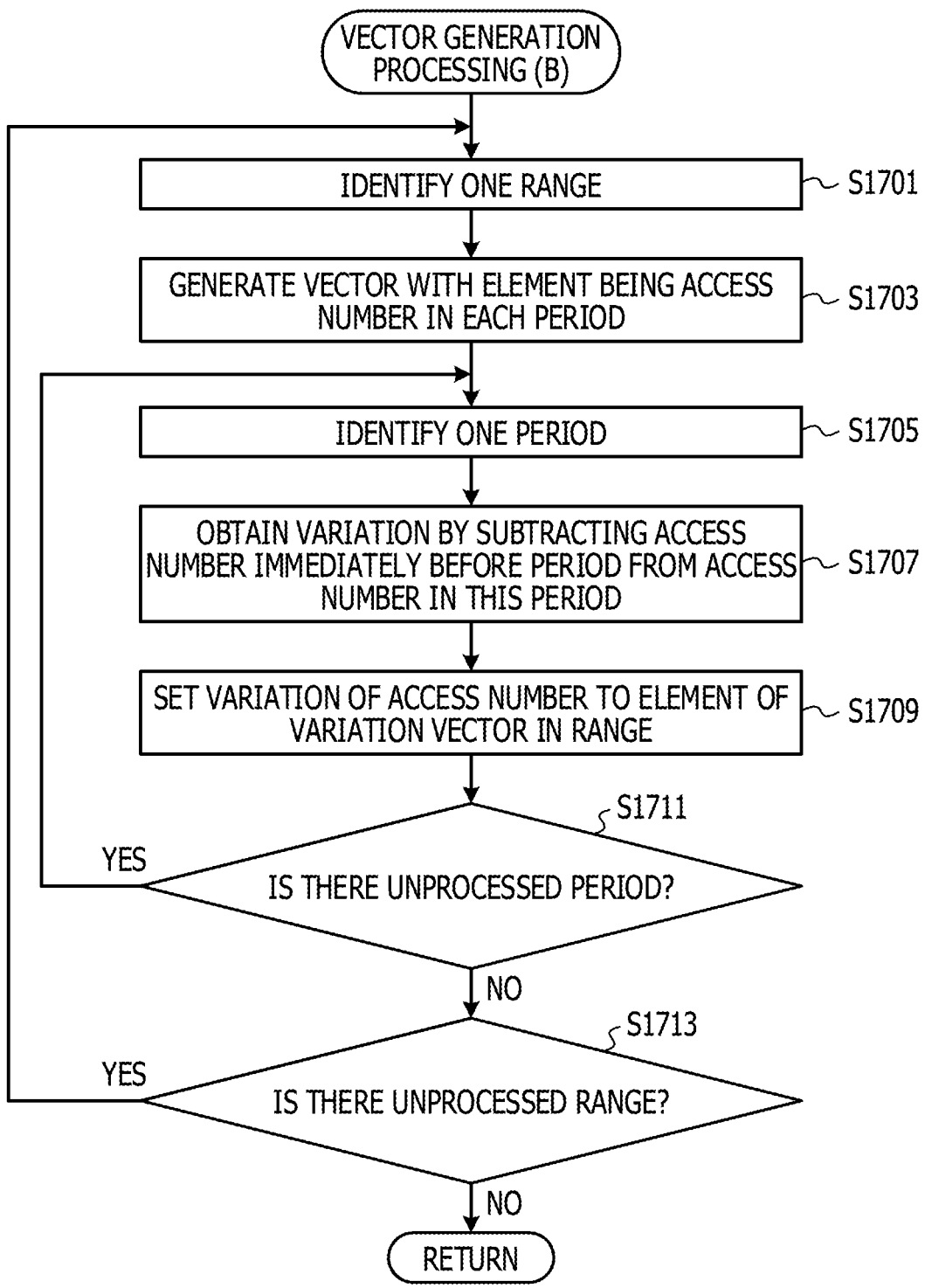
FIG. 17 is a diagram illustrating a flow of vector generation processing (B)

In this embodiment, vector generation processing (B) is performed, in place of the vector generation processing (A). FIG. 17 illustrates a flow of the vector generation processing (B). As with the vector generation processing (A), the vector generation unit 621 identifies one range (S1701). The vector generation unit 621 then generates a vector with an element being the number of times of access in the range for each period (S1703), as with the vector generation processing (A).

Next, the vector generation unit 621 identifies one period (S1705). The vector generation unit 621 identifies period IDs in ascending order, for example.

The vector generation unit 621 obtains a variation by subtracting the access number immediately before a period from the access number in the period (S1707). The vector generation unit 621 then sets the variation of the access number to an element of the variation vector in the range identified in S1701 (S1709).

The vector generation unit 621 determines whether there is an unprocessed period (S1711). If it is determined that there is an unprocessed period, the process returns to S1705 and the above-mentioned processing is repeated.

On the other hand, if determining that there is no unprocessed period, the vector generation unit 621 determines whether there is an unprocessed range (S1713). If it is determined that there is an unprocessed range, the process returns to S1701 and the above-mentioned processing is repeated.

On the other hand, if it is determined that there is no unprocessed range, the vector generation processing (B) ends. Then, the process goes back to the analysis processing (A), which is a caller. Note that, in the clustering processing in S1103, clustering is performed on the variation vectors to divide the ranges into a strongly correlated group.

According to this embodiment, the correlation between the ranges is easily identified when the number of times of access made by the application program 109 varies.

Embodiment 3

This embodiment describes an example of converting the element of the above-mentioned vector to a value suitable for the clustering.

Figure 18:
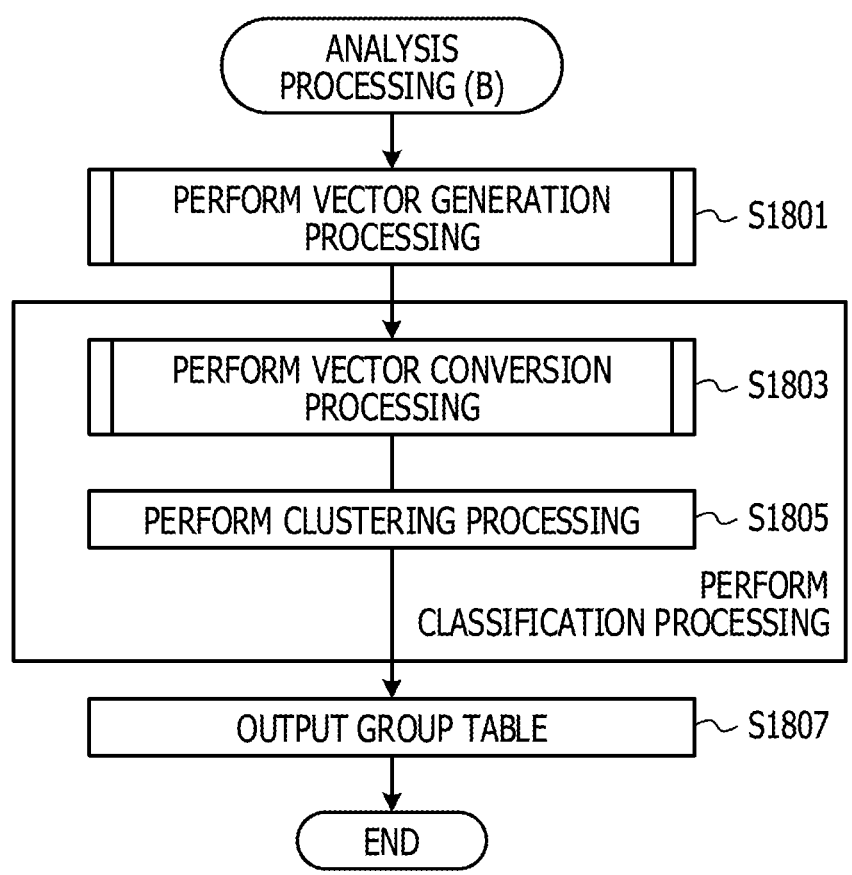
FIG. 18 is a diagram illustrating a flow of analysis processing (B)

In this embodiment, analysis processing (B) is performed, in place of the analysis processing (A). FIG. 18 illustrates a flow of the analysis processing (B). The vector generation unit 621 performs vector generation processing (S1801). At this time, the vector generation unit 621 may perform the vector generation processing (A) or the vector generation processing (B).

Figure 19:
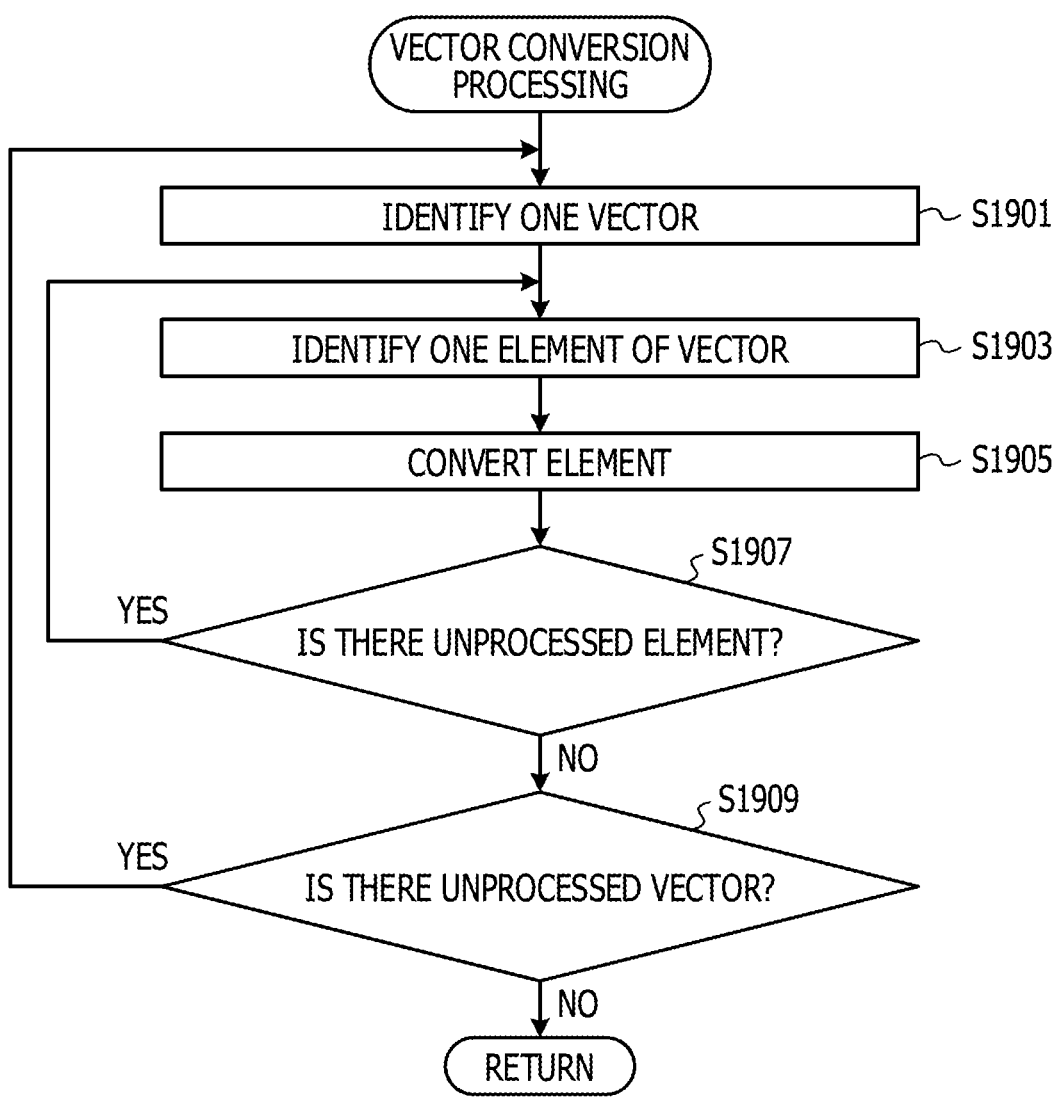
FIG. 19 is a diagram illustrating a flow of vector conversion processing.

The vector conversion unit 631 performs vector conversion processing (S1803). In the vector conversion processing, a vector generated in the vector generation processing is converted. FIG. 19 illustrates a flow of the vector conversion processing. The vector conversion unit 631 identifies one vector corresponding to the range (S1901). For example, the vector conversion unit 631 identifies the range ID one at a time in ascending order.

The vector conversion unit 631 identifies one element of the vector (S1903). For example, the vector conversion unit 631 identifies elements in order. The vector conversion unit 631 converts the element (S1905), in which the value of the original element is converted to a value of a new element.

For example, a square root of the original value may be obtained for the value of the new element. The transformation to the square root may suppress influence of an excessive number of times of access, for example.

Alternatively, the value of the new element may be log e (original value+1). As with the case of the square root transformation, this case may also suppress influence of an excessive number of times of access, for example. However, the degree of suppression is different.

Figure 20:
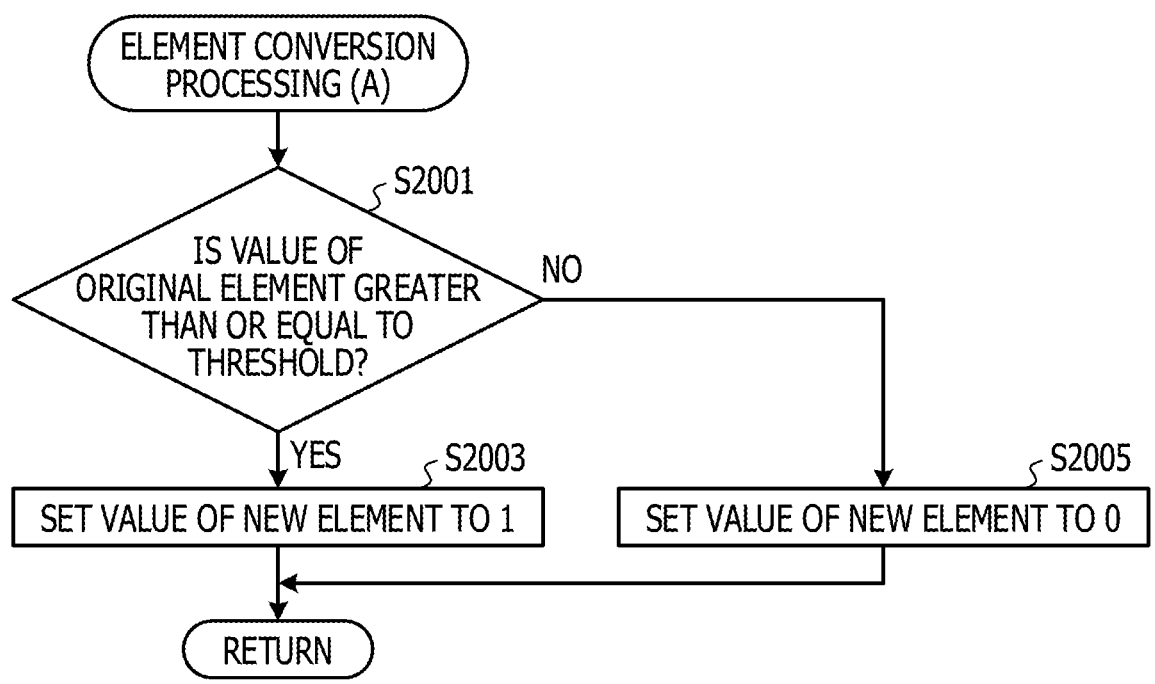
FIG. 20 is a diagram illustrating a flow of element conversion processing (A)

Element conversion processing (A) illustrated in FIG. 20 may be performed. In the element conversion processing (A), determination using a threshold is made and the original value is converted to a binary number.

The vector conversion unit 631 determines whether the value of the original element, that is, the value of the element in the vector to be converted is greater than or equal to a threshold (S2001).

If determining that the value of the original element is greater than or equal to the threshold, the vector conversion unit 631 sets the value of the new element to 1 (S2003). On the other hand, if determining that the value of the original element is below the threshold, the vector conversion unit 631 sets the value of the new element to 0 (S2005). The element conversion processing (A) ends and the process goes back to the vector conversion processing.

Figure 21:
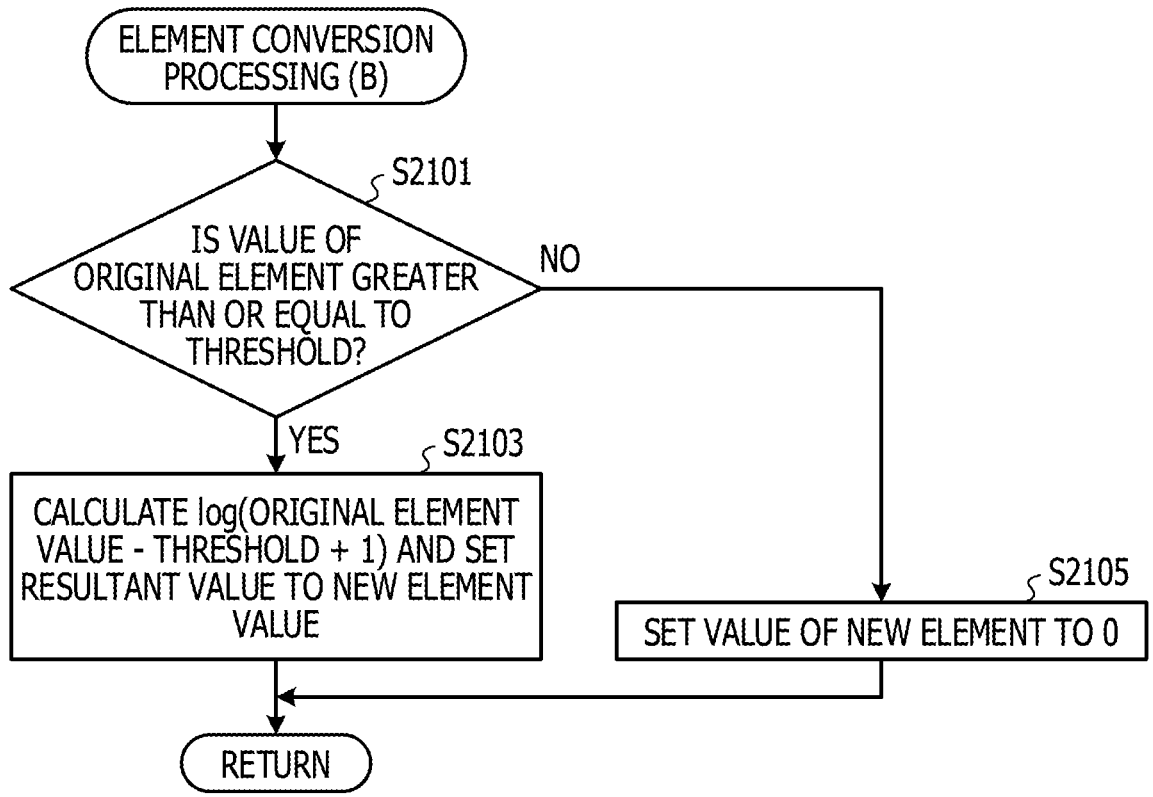
FIG. 21 is a diagram illustrating a flow of element conversion processing (B)

Element conversion processing (B) illustrated in FIG. 21 may be performed. In the element conversion processing (B), if the original value is greater than or equal to a threshold, logarithmic transformation is performed.

As with the element conversion processing (A), the vector conversion unit 631 determines whether the value of the original element is greater than or equal to the threshold (S2101).

If determining that the value of the original element is greater than or equal to the threshold, the vector conversion unit 631 calculates log (original element value−threshold+1) and sets the resultant value to a value of a new element (S2103). On the other hand, if determining that the value of the original element is below the threshold, the vector conversion unit 631 sets the value of the new element to 0 (S2105). The element conversion processing (B) ends and the process goes back to the vector conversion processing.

Figure 22:
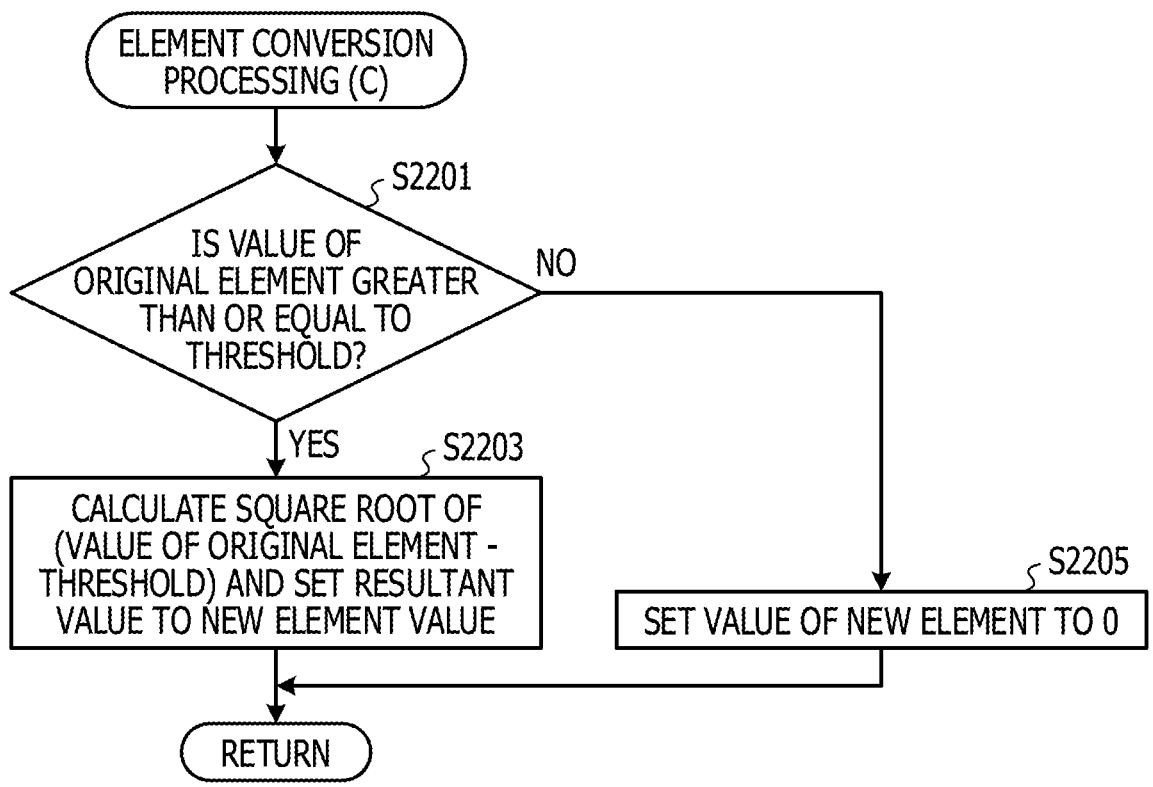
FIG. 22 is a diagram illustrating a flow of element conversion processing (C)

Moreover, element conversion processing (C) illustrated in FIG. 22 may be performed. In the element conversion processing (C), if the original value is greater than or equal to the threshold, square-root transformation is performed.

As with the element conversion processing (A), the vector conversion unit 631 determines whether the value of the original element is greater than or equal to the threshold (S2201).

If determining that the value of the original element is greater than or equal to the threshold, the vector conversion unit 631 calculates a square root of (value of original element−threshold) and sets the resultant value to a new element value (S2203). On the other hand, if determining that the value of the original element is below the threshold, the vector conversion unit 631 sets the value of the new element to 0 (S2205). The element conversion processing (C) ends and the process goes back to the vector conversion processing.

Referring back to the description of FIG. 19, the vector conversion unit 631 determines whether there is an unprocessed element (S1907). If it is determined that there is an unprocessed element, the process returns to S1903 and the above-mentioned processing is repeated.

On the other hand, if determining that there is no unprocessed element, the vector conversion unit 631 determines whether there is an unprocessed vector (S1909). If it is determined that there is an unprocessed vector, the process returns to S1901 and the above-mentioned processing is repeated.

On the other hand, if it is determined that there is no unprocessed vector, the vector conversion processing ends. Then, the process goes back to the analysis processing (B).

Referring back to the description of FIG. 18, the clustering unit 633 performs the clustering processing (S1805). In the clustering processing, the clustering is performed on the converted vectors to divide the ranges into a strongly correlated group. As described above, hierarchical clustering may be performed or non-hierarchical clustering may be performed. Note that the vector conversion processing and the clustering processing in this embodiment correspond to the classification processing performed by the classification unit 629.

The output unit 609 outputs the group table (S1807). The analysis processing (B) then ends.

According to this embodiment, of the elements in the respective vectors, an element falling below a reference is converted to a predetermined value, and the clustering is performed on the converted vector, and therefore, an analysis error attributable to accidental or steady access is easily removed, for example.

Embodiment 4

This embodiment describes a second application example. In the second application example, preloading is performed when an access command is not accepted.

Figure 23:
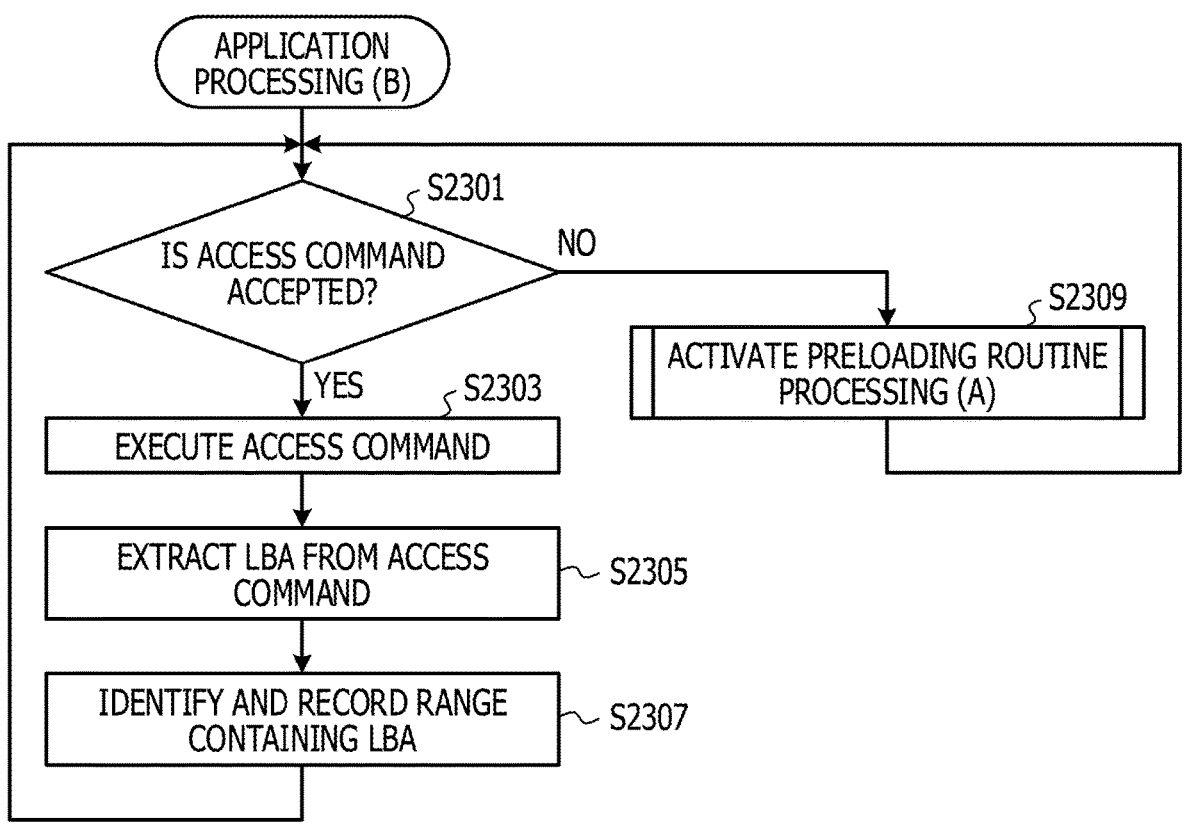
FIG. 23 is a diagram illustrating a flow of application processing (B)

In this embodiment, application processing (B) is performed, in place of the application processing (A). FIG. 23 illustrates a flow of the application processing (B). The access control unit 113 determines whether the first accepting unit 111 accepts an access command (S2301).

If it is determined that the access command is accepted, the access control unit 113 executes the accepted access command (S2303). The access control unit 113 extracts the LBA from the executed access command (S2305). The access control unit 113 identifies a range containing the LBA and records the set of the LBA and the range in the log table (S2307). Then, the process returns to S2301.

FIG. 24 illustrates an example of the log table. The log table in this example contains a record corresponding to the single-time access. The record of the log table has a field in which the access date and time is stored and a field in which the range ID is stored.

The access date and time identifies a timing at which access has been made. The range ID identifies a range containing the LBA that has been accessed.

The first record illustrated in FIG. 24 indicates that the access to the LBA contained in a range ID: $E_2$ has been made on the date and time: $T_1$.

Referring back to the description of FIG. 23, if determining that an access command is not accepted in S2301, the access control unit 113 activates preloading routine processing (A) (S2309). The preloading routine processing (A) is performed in parallel with the application processing (B).

Figure 25:
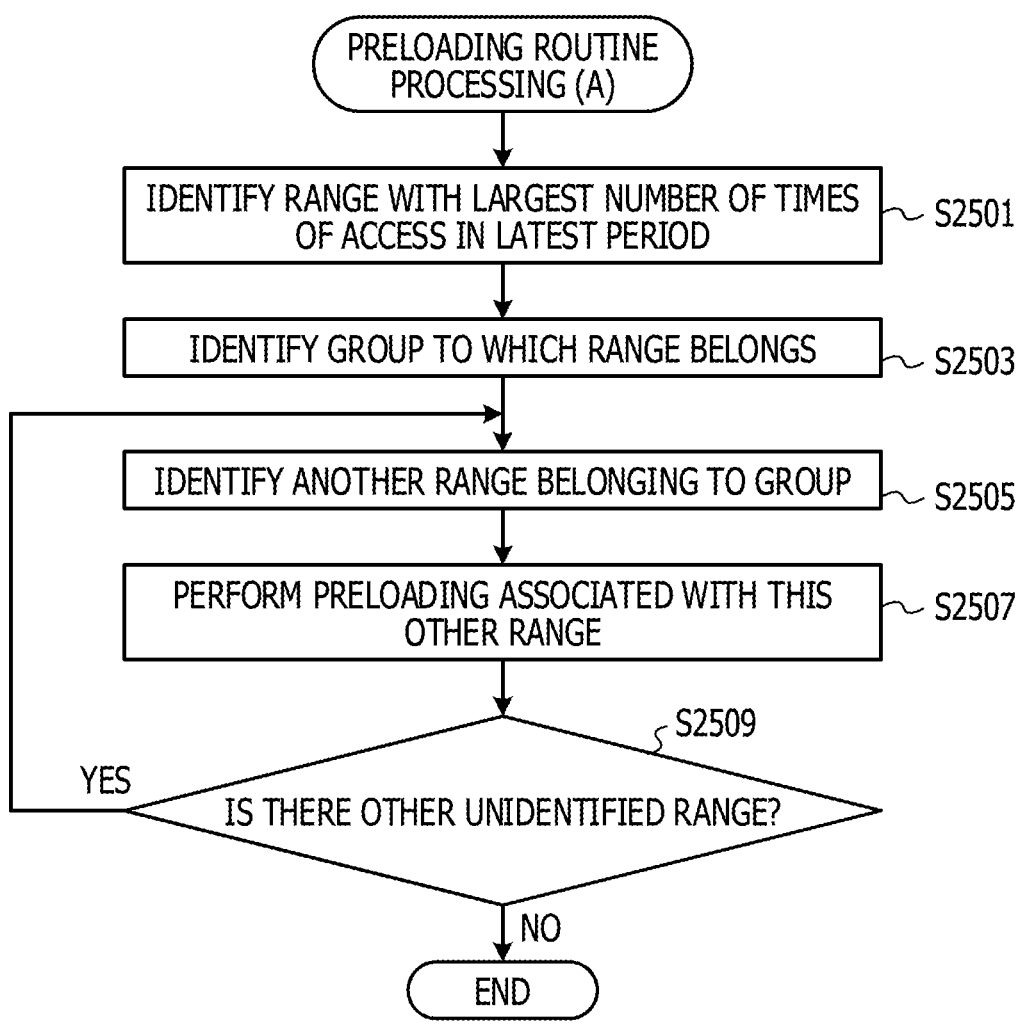
FIG. 25 is a diagram illustrating a flow of preloading routine processing (A)

FIG. 25 illustrates a flow of the preloading routine processing (A). The access control unit 113 identifies the range with the largest number of times of access in the latest period based on the log table (S2501). The access control unit 113 further identifies a group to which the range belongs, based on the group table (S2503).

The access control unit 113 identifies another range belonging to this group based on the group table (S2505). For example, the access control unit 113 identifies range IDs in ascending order. The access control unit 113 performs preloading associated with this other range (S2507).

The access control unit 113 determines whether there is other unidentified range (S2509). If it is determined that there is other unidentified range, the process returns to S2505 and the above-mentioned processing is repeated.

On the other hand, if it is determined that there is no unidentified range, the preloading routine processing (A) ends.

According to this embodiment, the preloading is not performed while access commands are concentrated, so that responsiveness to the I/O request may be improved.

Embodiment 5

This embodiment describes a third application example. In the third application example, preloading is periodically performed.

Figure 26:
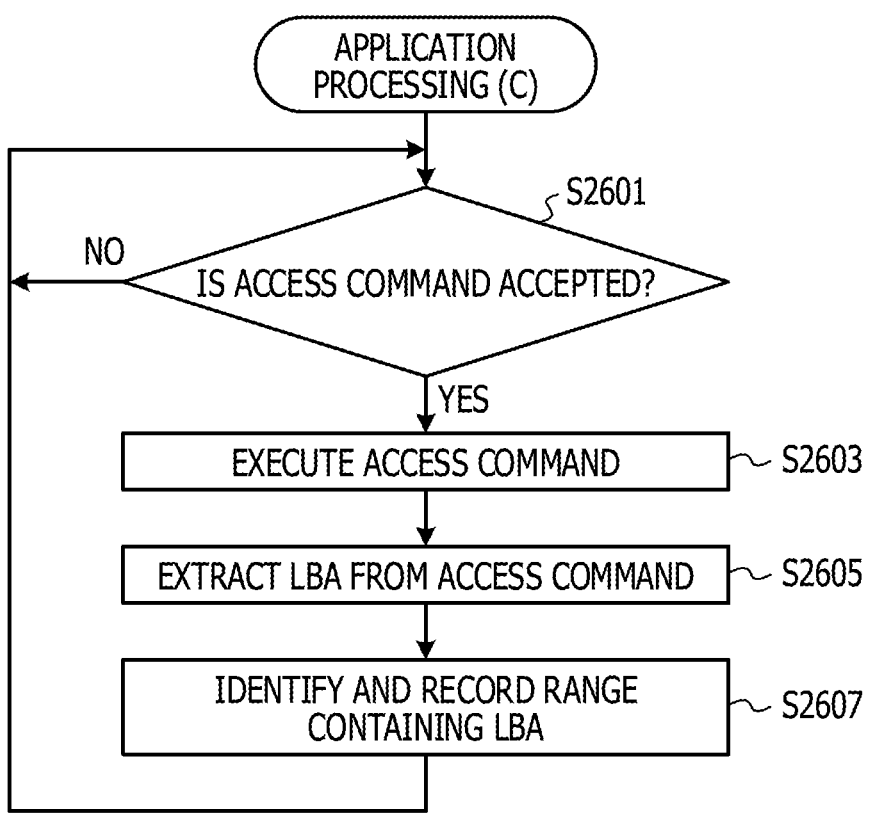
FIG. 26 is a diagram illustrating a flow of application processing (C)

In this embodiment, application processing (C) is performed. FIG. 26 illustrates a flow of the application processing (C). The access control unit 113 determines whether the first accepting unit 111 accepts an access command (S2601).

If it is determined that an access command is not accepted, the process repeats S2601.

On the other hand, if determining that the access command is accepted, the access control unit 113 executes the access command (S2603).

The processing from S2603 to S2607 is the same as that from S2303 to S2307 in FIG. 23.

Figure 27:
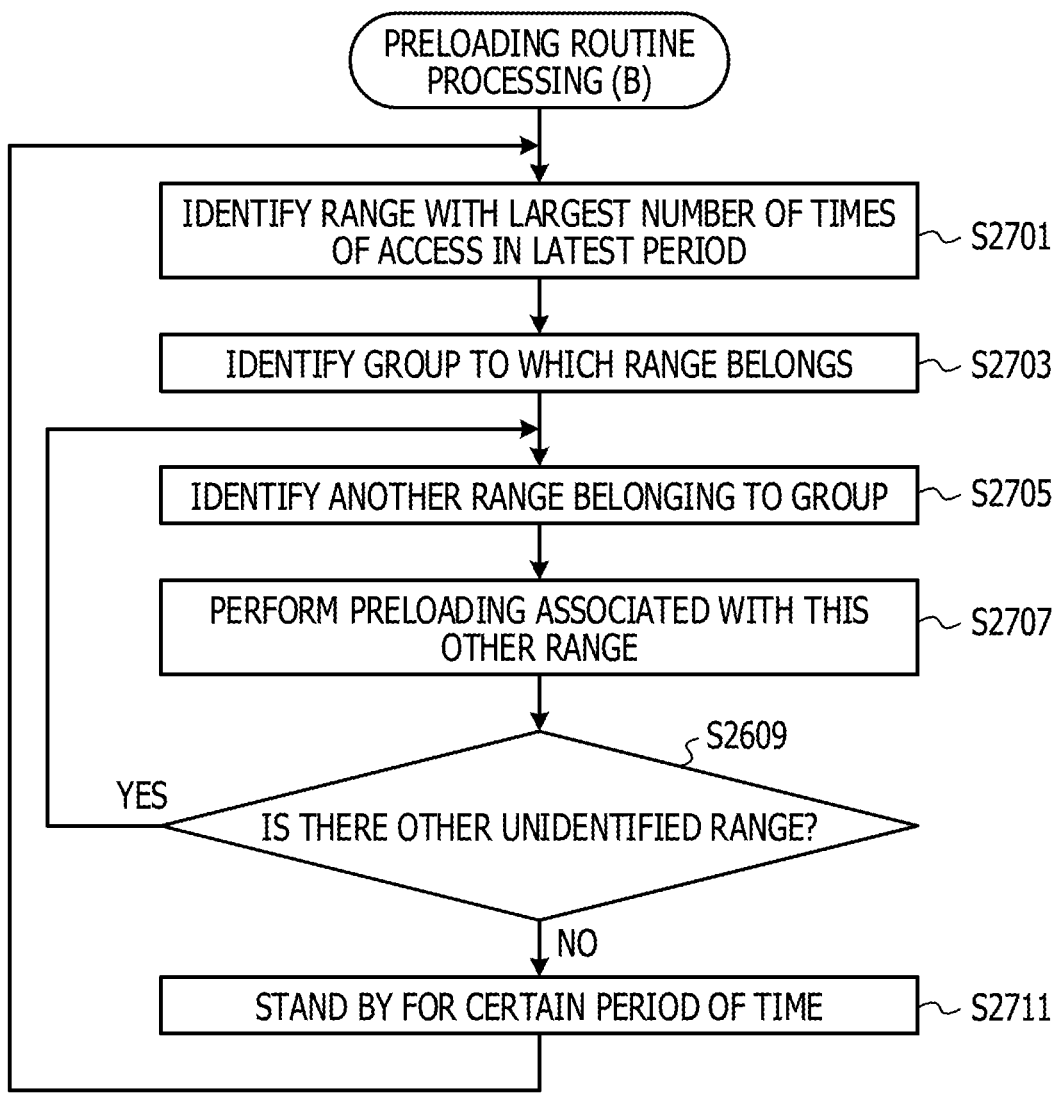
FIG. 27 is a diagram illustrating preloading routine processing (B)

In this embodiment, preloading routine processing (B) is performed in parallel with the application processing (C). FIG. 27 illustrates the preloading routine processing (B). The processing from S2701 to S2709 is the same as that from S2501 to S2509 in FIG. 25.

The access control unit 113 stands by for a certain period of time (S2711), and the process returns to S2701 and the above-mentioned processing is repeated.

According to this embodiment, processing load of the preloading may be temporally distributed.

Embodiment 6

The above-mentioned embodiments describe the examples of preloading associated with the read command and the write command. This embodiment describes an example of preloading associated with the read command.

Figure 28:
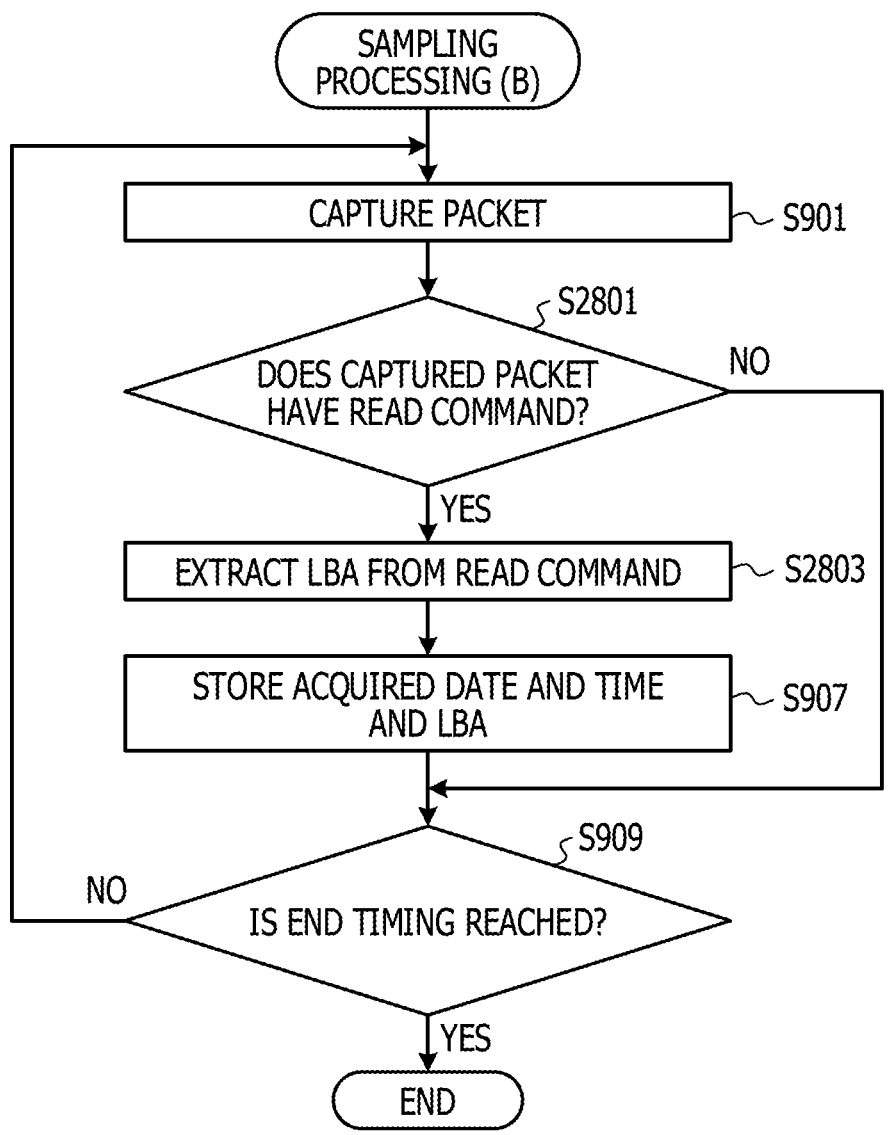
FIG. 28 is a diagram illustrating a flow of sampling processing (B)

In this embodiment, sampling processing (B) is performed, for example, in place of the sampling processing (A). FIG. 28 illustrates a flow of the sampling processing (B). The processing of S901 is the same as that of FIG. 9.

The logging unit 613 determines whether the captured packet has a read command (S2801). If it is determined that the captured packet does not have a read command, the process proceeds to S909.

On the other hand, if determining that the captured packet has a read command, the logging unit 613 extracts an LBA from the read command (S2803).

The processing of S907 and S909 is the same as that of FIG. 9.

Figure 29:
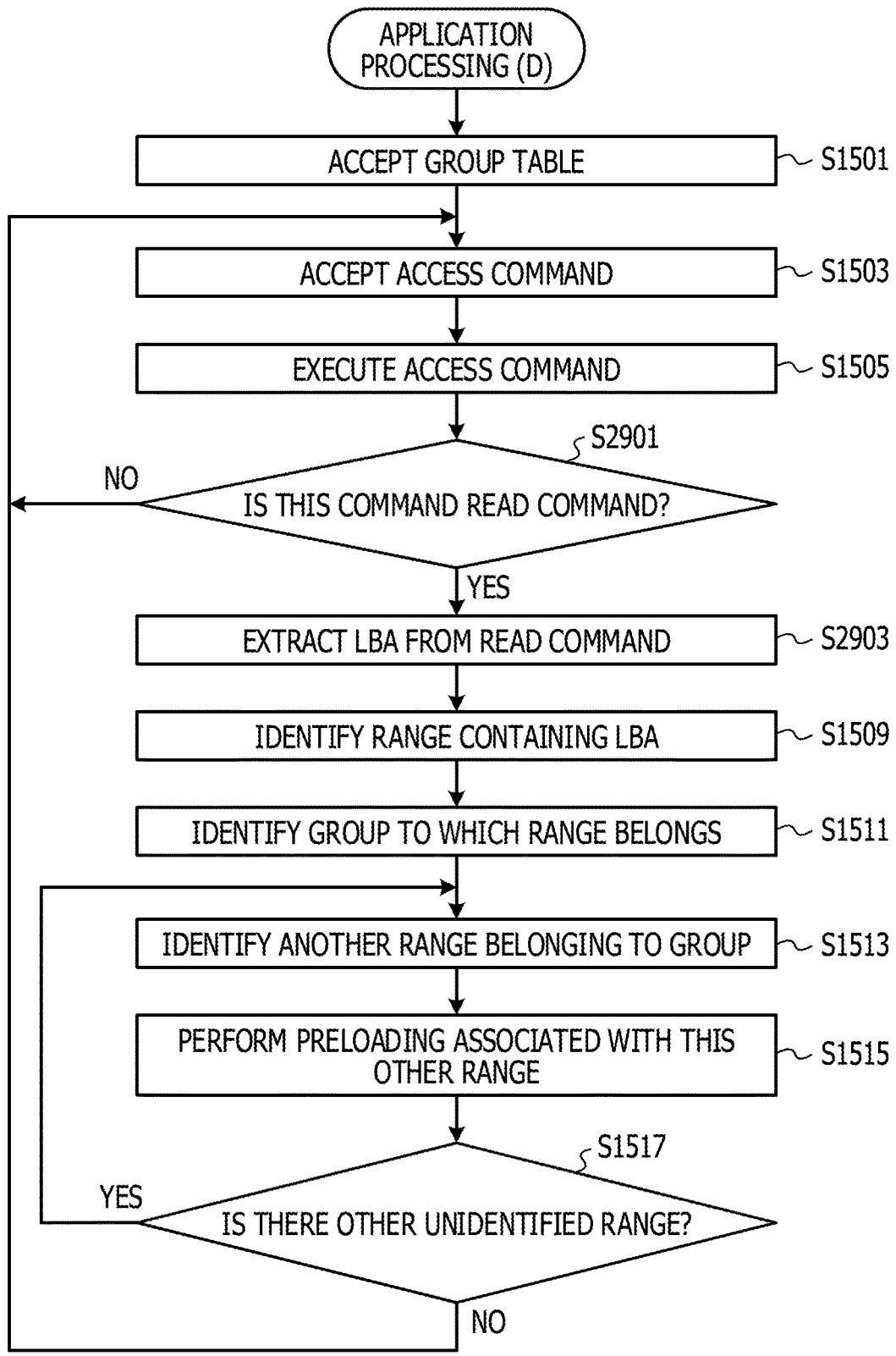
FIG. 29 is a diagram illustrating a flow of application processing (D)

In this embodiment, application processing (D) is performed, for example, in place of the application processing (A). FIG. 29 illustrates a flow of the application processing (D). The processing from S1501 to S1505 is the same as that of FIG. 15.

The access control unit 113 determines whether the executed access command is a read command (S2901). If it determined that the executed access command is not a read command, the process returns to S1503 and the above-mentioned processing is repeated.

On the other hand, if determining that the executed access command is a read command, the access control unit 113 extracts an LBA from the read command (S2903).

The processing from S1509 to S1517 is the same as that of FIG. 15.

According to this embodiment, resources may be used with a priority given to speedy read processing when many application programs 109 with importance given to the performance of the read processing reside, for example.

Embodiment 7

This embodiment describes an example of preloading associated with the write command.

Figure 30:
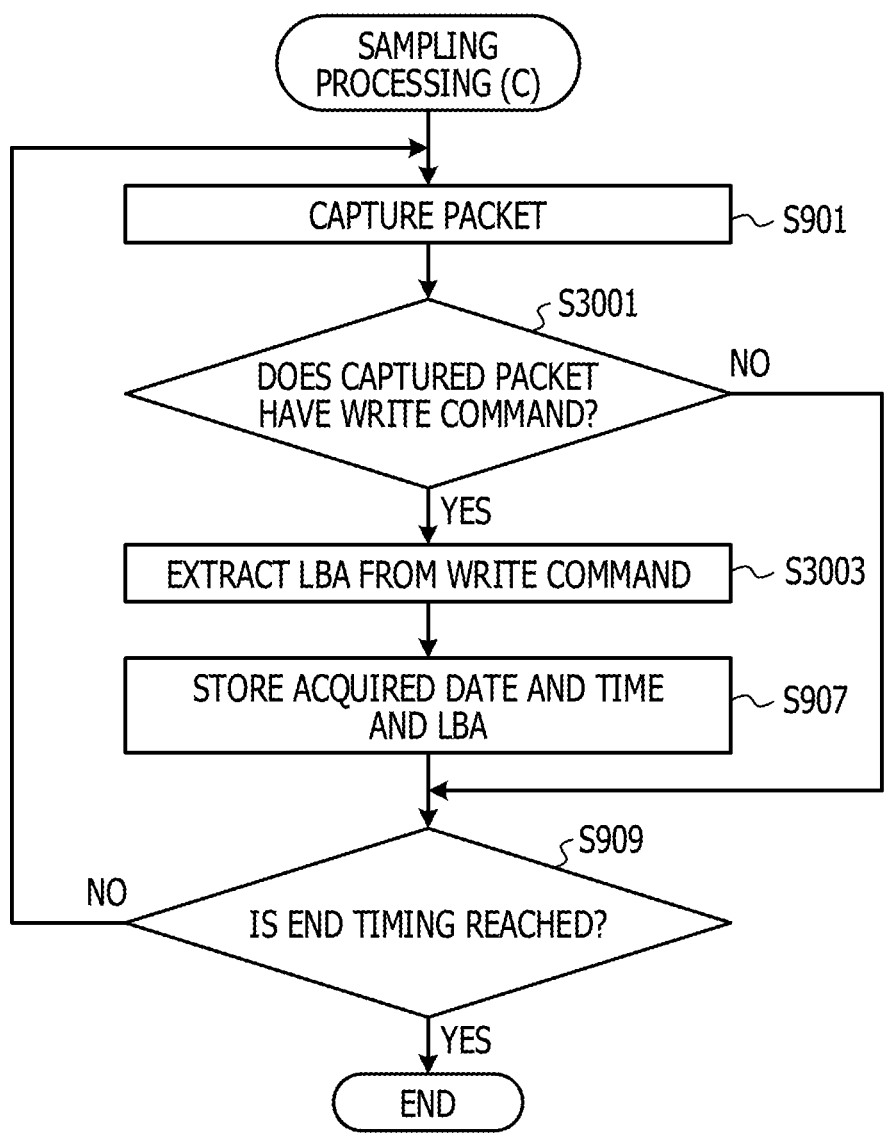
FIG. 30 is a diagram illustrating a flow of sampling processing (C)

In this embodiment, sampling processing (C) is performed, for example, in place of the sampling processing (A). FIG. 30 illustrates a flow of the sampling processing (C). The processing of S901 is the same as that of FIG. 9.

The logging unit 613 determines whether the captured packet has a write command (S3001). If it is determined that the captured packet does not have a write command, the process proceeds to S909.

On the other hand, if determining that the captured packet has a write command, the logging unit 613 extracts an LBA from the write command (S3003).

The processing of S907 and S909 is the same as that of FIG. 9.

Figure 31:
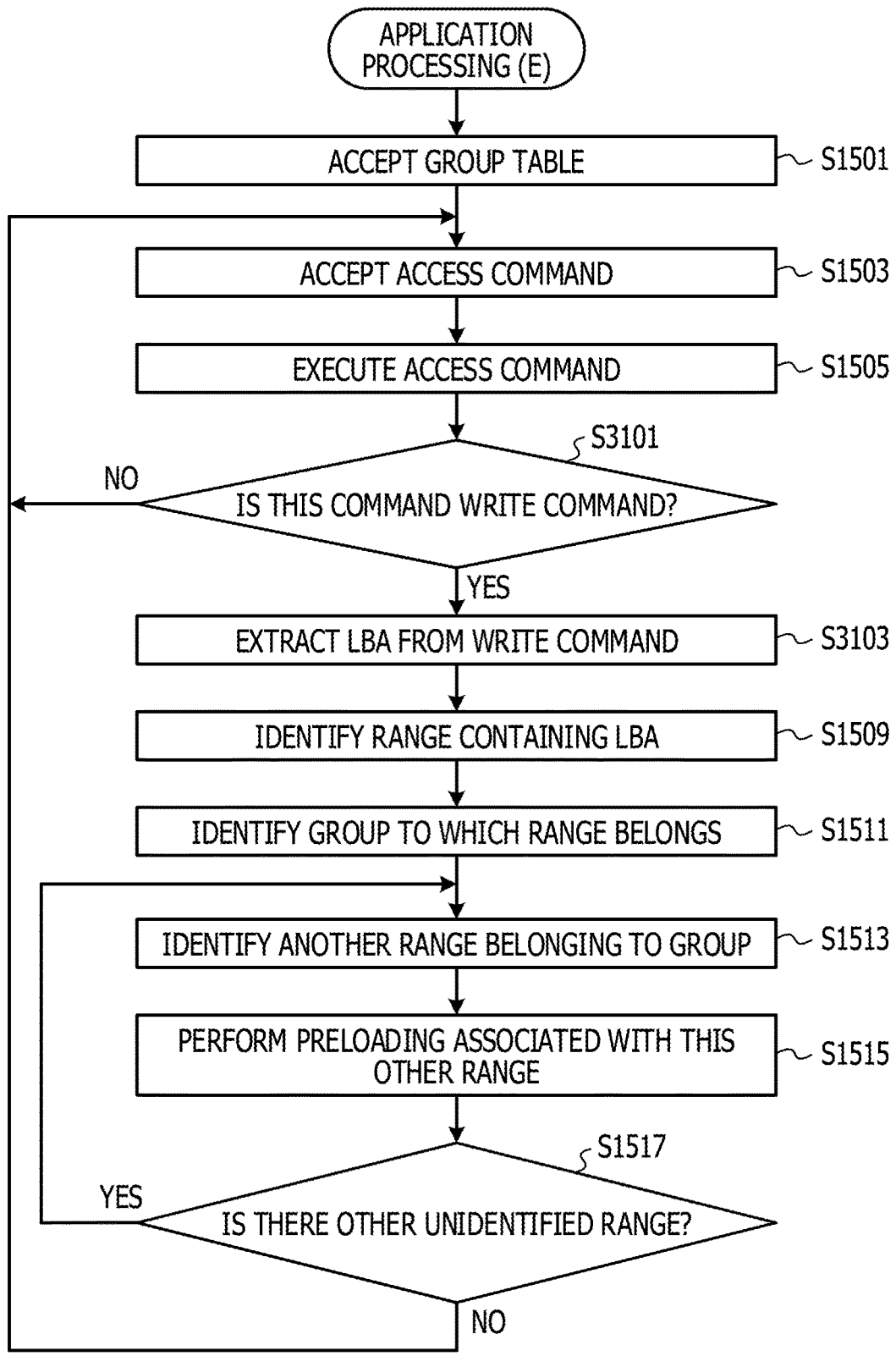
FIG. 31 is a diagram illustrating a flow of application processing (E)

In this embodiment, application processing (E) is performed, for example, in place of the application processing (A). FIG. 31 illustrates a flow of the application processing (E). The processing from S1501 to S1505 is the same as that of FIG. 15.

The access control unit 113 determines whether the executed access command is a write command (S3101). If it is determined that the executed access command is not a write command, the process returns to S1503 and the above-mentioned processing is repeated.

On the other hand, if determining that the executed access command is a write command, the access control unit 113 extracts an LBA from the write command (S3103).

The processing from S1509 to S1517 is the same as that of FIG. 15.

According to this embodiment, resources may be used with a priority given to speedy write processing when many application programs 109 with importance given to the performance of the write processing reside, for example.

Embodiment 8

This embodiment describes an example of performing the sampling and the analysis in the storage server device 105.

Figure 32:
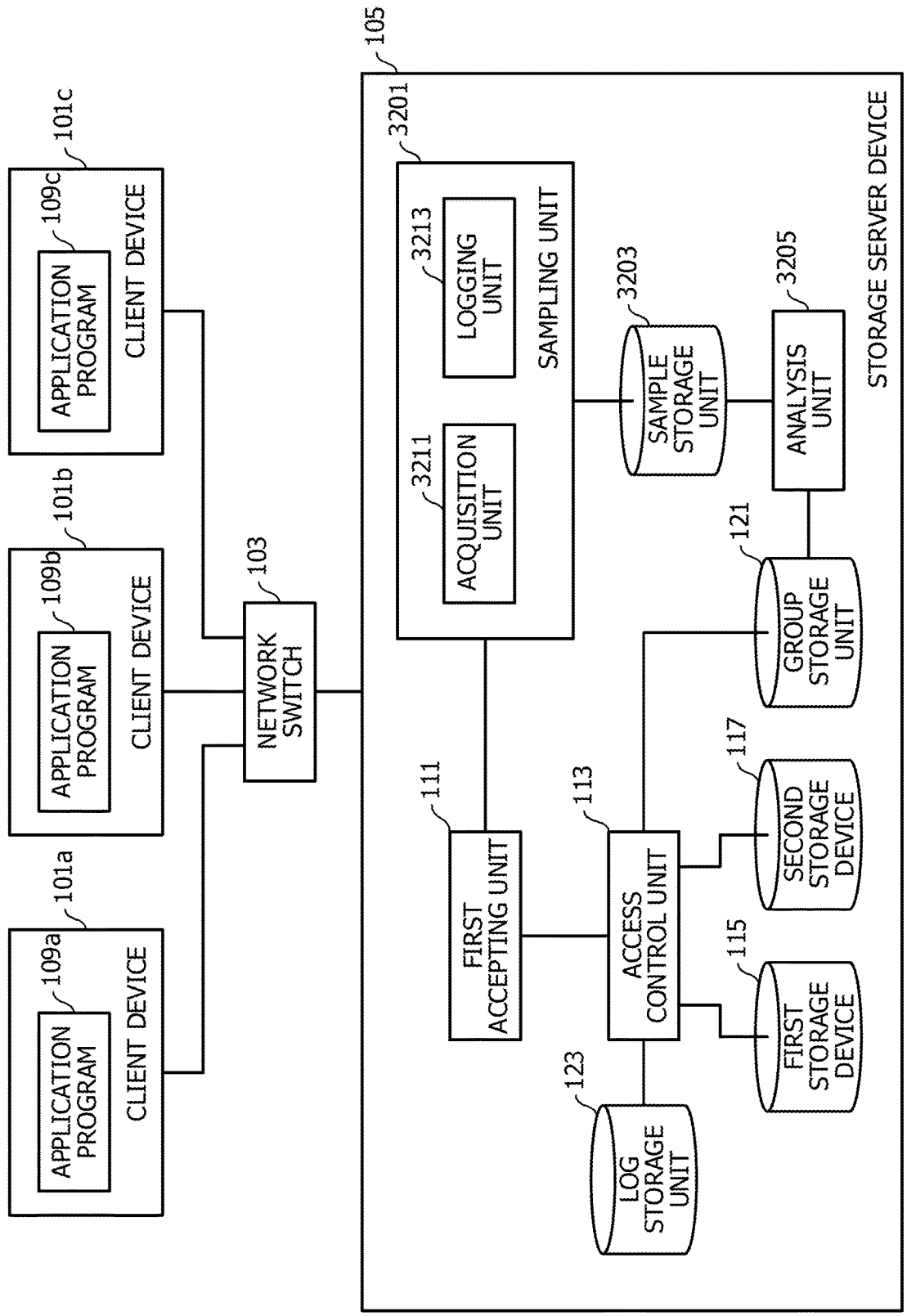
FIG. 32 is a diagram illustrating an example system configuration.

FIG. 32 illustrates an example system configuration. The storage server device 105 includes a sampling unit 3201, a sample storage unit 3203, and an analysis unit 3205, in addition to the first accepting unit 111, the access control unit 113, the first storage device 115, the second storage device 117, the group storage unit 121, and the log storage unit 123.

The sampling unit 3201 has an acquisition unit 3211 and a logging unit 3213. The acquisition unit 3211 acquires an access command from the first accepting unit 111. The logging unit 3213 is similar to the logging unit 613. The sample storage unit 3203 is similar to the sample storage unit 603. The analysis unit 3205 is similar to the analysis unit 605 except that the output of the group table is omitted.

The sampling unit 3201, the analysis unit 3205, the acquisition unit 3211, and the logging unit 3213, which are mentioned above, are implemented using hardware resources (FIG. 36, for example) and a program that causes a processor to execute the later-described processing.

The above-mentioned sample storage unit 3203 is implemented using a hardware resource (FIG. 36, for example).

Figure 33:
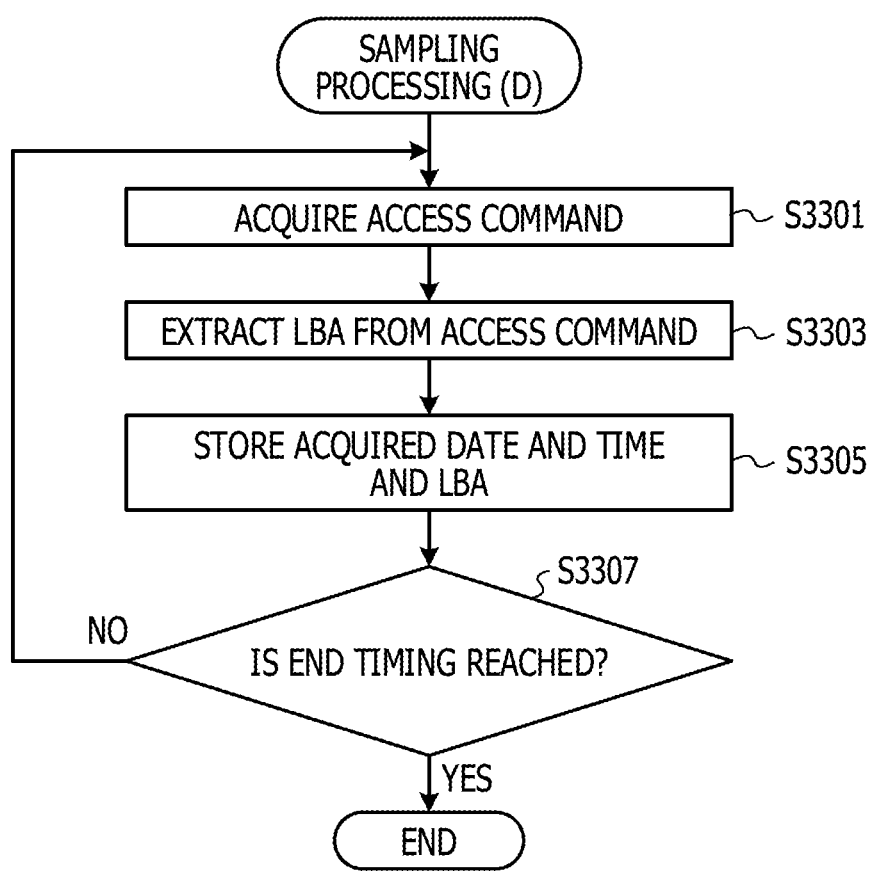
FIG. 33 is a diagram illustrating a flow of sampling processing (D)

The storage server device 105 of this embodiment performs sampling processing (D). FIG. 33 illustrates a flow of the sampling processing (D). The acquisition unit 3211 acquires an access command from the first accepting unit 111 (S3301). The logging unit 3213 extracts an LBA from the acquired access command (S3303). The logging unit 3213 stores the acquired date and time and the LBA in a new record of the sample table (S3305).

The logging unit 3213 determines whether the end timing is reached (S3307). If it is determined that the end timing is not reached, the process returns to S3301 and the above-mentioned processing is repeated. On the other hand, if it is determined that the end timing is reached, the sampling processing (D) ends.

The application processing in the storage server device 105 is similar to that described in the above-mentioned embodiments except that the acceptance of the group table is omitted.

As described in the embodiment 6, preloading associated with the read command may be performed. In this case, the storage server device 105 performs sampling processing (E).

Figure 34:
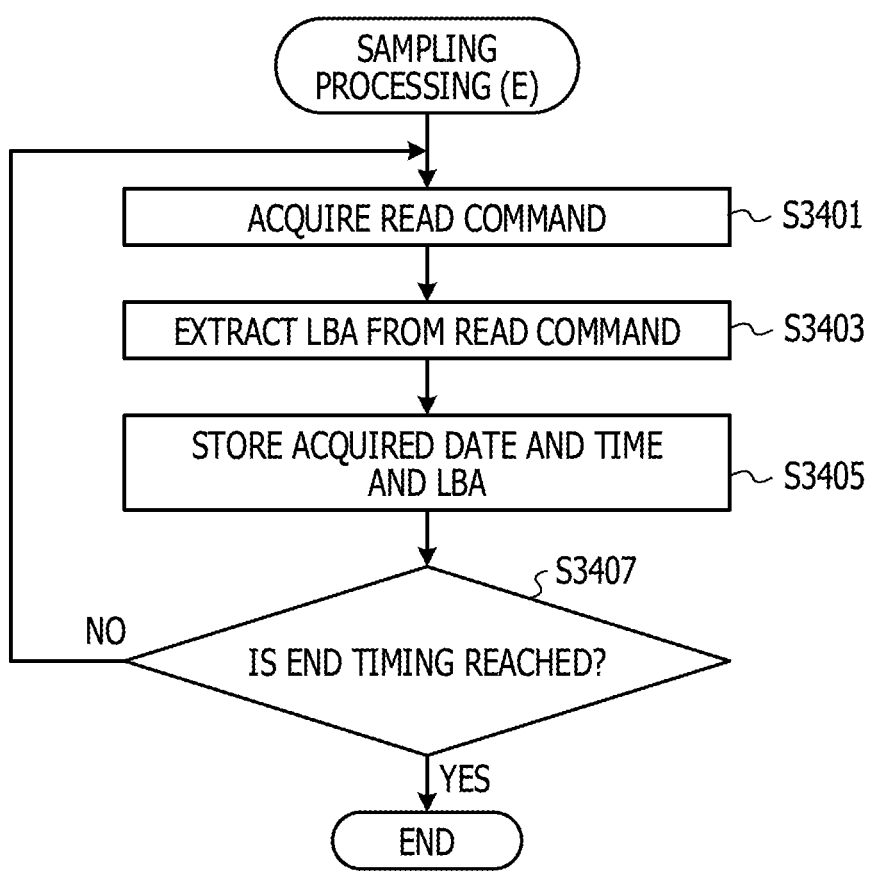
FIG. 34 is a diagram illustrating a flow of sampling processing (E)

FIG. 34 illustrates a flow of the sampling processing (E). The acquisition unit 3211 acquires a read command from the first accepting unit 111 (S3401). The logging unit 3213 extracts an LBA from the acquired read command (S3403). The logging unit 3213 stores the acquired date and time and the LBA in a new record of the sample table (S3405).

The logging unit 3213 determines whether the end timing is reached (S3407). If it is determined that the end timing is not reached, the process returns to S3401 and the above-mentioned processing is repeated. On the other hand, if it is determined that the end timing is reached, the sampling processing (E) ends.

As described in the embodiment 7, preloading associated with the write command may be performed. In this case, the storage server device 105 performs sampling processing (F).

Figure 35:
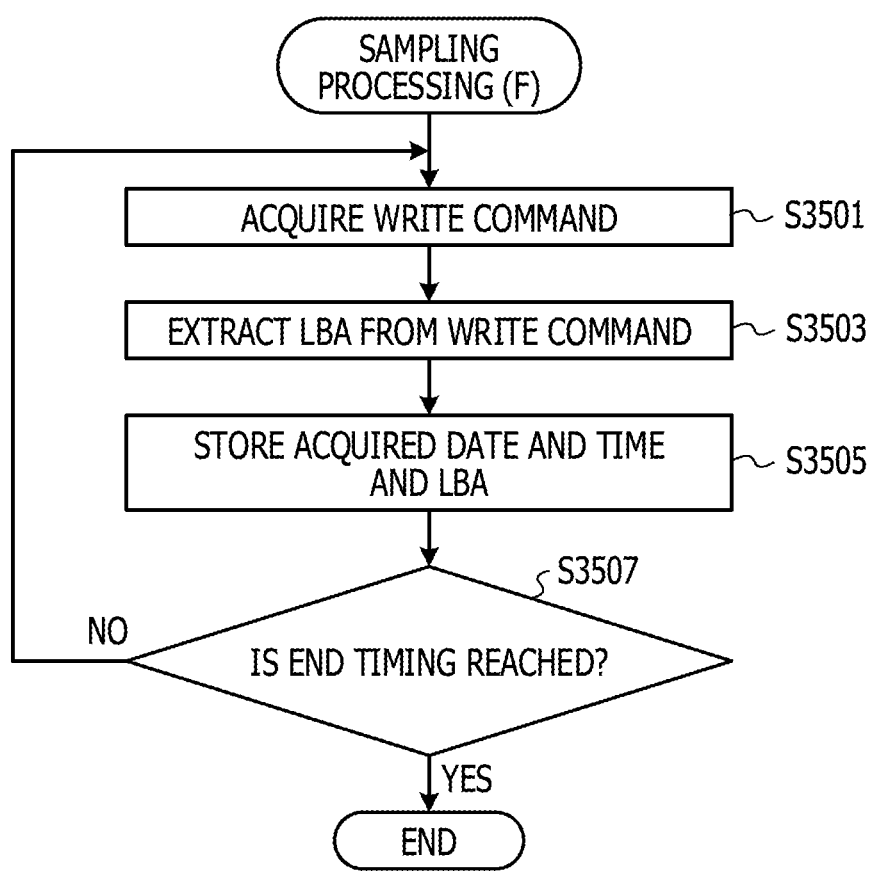
FIG. 35 is a diagram illustrating a flow of sampling processing (F)

FIG. 35 illustrates a flow of the sampling processing (F). The acquisition unit 3211 acquires the write command from the first accepting unit 111 (S3501). The logging unit 3213 extracts an LBA from the acquired write command (S3503). The logging unit 3213 stores the acquired date and time and the LBA in a new record of the sample table (S3505).

The logging unit 3213 determines whether the end timing is reached (S3507). If it is determined that the end timing is not reached, the process returns to S3501 and the above-mentioned processing is repeated. On the other hand, if it is determined that the end timing is reached, the sampling processing (F) ends.

According to this embodiment, the system configuration may be simplified. For example, when a relatively small number of I/O requests are processed or when the storage server device 105 has a high processing capability, the capture server device 107 may be omitted.

Although the examples of analyzing the access to an auxiliary storage have been described, these embodiments may be applied to the analysis of the access to a main storage.

The embodiments of the present disclosure have been described above. However, the present disclosure is not limited thereto. For example, the functional block configurations described above may not coincide with a program module configuration.

Moreover, the configurations of the storage areas described above may be an example and other configurations may be adopted. Also in the processing flows, the processing order may be replaced or multiple pieces of the processing may be performed in parallel, so long as the same processing result is obtained.

The storage server device 105 and the capture server device 107 described above are computing devices, in which a memory 2501, a central processing unit (CPU) 2503, a hard disk drive (HDD) 2505, a display control unit 2507 connected to a display device 2509, a drive device 2513 for a removal disk 2511, an input device 2515, and a communication control unit 2517 for connecting to a network are connected to one another via a bus 2519, as illustrated in FIG. 36. An operating system (OS) and the application programs that perform the processing in the embodiments are stored in the HDD 2505 and loaded from the HDD 2505 into the memory 2501 when executed by the CPU 2503. The CPU 2503 controls the display control unit 2507, the communication control unit 2517, and the drive device 2513 in accordance with the processing performed by the application programs to cause the display control unit 2507, the communication control unit 2517, and the drive device 2513 to perform a prescribed operation. The data in processing is stored mainly in the memory 2501 but may be stored in the HDD 2505. In the embodiments of the present disclosure, the application programs that perform the above-mentioned processing are stored in the computer readable removable disk 2511 to be distributed, and installed in the HDD 2505 from the drive device 2513. The application programs are installed in the HDD 2505 via a network such as the Internet and the communication control unit 2517 in some cases. Such a computing device is closely coordinated with hardware such as the CPU 2503 and the memory 2501, which are mentioned above, and a program such as the OS and the application program to achieve the above-mentioned various functions.

The embodiments described above is summarized as follows.

The analysis method according to the embodiments includes (A) for each of a plurality of ranges obtained by dividing a storage area, calculating an access number or a variation of the access number in each of a plurality of periods, and (B) identifying a correlation between the ranges based on the access number or the variation of the access number for each period in each range.

By doing so, it is easier to predict a range to be accessed close in time to another range in the storage area.

Moreover, the correlation between the ranges may be identified by performing clustering on the vectors in the ranges each with the element being the access number or the variation of the access number for each period.

This makes it easier to identify the correlated range.

Furthermore, of the elements in the respective vectors, an element falling below a reference may be converted to a predetermined value, and the clustering may be performed on the converted vector.

By doing so, an analysis error attributable to accidental access or steady access is easily removed, for example.

The storage area may be a logical storage area in which storage hierarchy control is performed by using a plurality of storage devices. Furthermore, processing of identifying a range of data to be moved in the storage hierarchy control may be included, based on the correlation between the ranges.

By doing so, resources are effectively used with ease.

A program that causes a computer to execute the processing in the above-mentioned method may be produced and stored in computer readable storage medium or a storage device such as a flexible disk, a CD-ROM, a magnetooptical disc, a semiconductor memory, and a hard disk. Results in the middle of the processing are temporarily stored in the storage device such as a main memory, in general.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A method performed by a computer for analyzing access to a storage device, the method comprising:
   executing, by a processor of the computer, a calculating process that includes generating an access vector for each of a plurality of ranges in the storage device, the access vector including a plurality of elements in a time order, each of the plurality of elements indicating an access number in a corresponding time period of a plurality of time periods or a variation of the access number in the corresponding time period, each of the plurality of ranges being a range corresponding to any of a plurality of storage areas in the storage device, the access number indicates the number of times each of the plurality of ranges is accessed;
   executing, by the processor of the computer, a determining process that includes determining a correlation between a first range and a second range by using a first access vector and a second access vector, the first access vector being the access vector generated for the first range in the storage device and including a plurality of elements in a time order, the second access vector being the access vector generated for the second range in the storage device and including a plurality of elements in a time order, the first range and the second range being any of the plurality of ranges;
   determining, in accordance with the correlation between the first range and the second range, whether the first range is correlated with the second range; and
   preloading the second range in response to a command for accessing the first range when the first range is correlated with the second range.

2. The method according to claim 1, wherein the determining process includes identifying the correlation between the first range and the second range by performing clustering on a plurality of access vectors generated for the plurality of ranges, each of the plurality of access vectors being generated by the calculating process.

3. The method according to claim 2, wherein the determining process is configured to:
   convert, for each of the plurality of access vectors, a value of a first element to a predetermined value, the first element being an element in the each of the plurality of access vectors and having a value lower than a threshold, and
   perform the clustering after the converting.

4. The method according to claim 1, wherein
   the storage device includes a plurality of storage elements,
   each of the plurality of ranges is a logical storage area in which storage hierarchy control is performed by aggregating the plurality of storage elements, and
   the determining process includes determining a range of data to be moved in the storage hierarchy control in accordance with the correlation between the first range and the second range.

5. A storage system comprising:
   an analysis device; and
   a control device configured to control a plurality of storage devices,
   the analysis device includes a processor configured to:
   execute a calculating process that includes generating a access vector for each of a plurality of ranges in the storage device, the access vector including a plurality of elements in a time order, each of the plurality of elements indicating an access number in a corresponding time period of a plurality of time periods or a variation of the access number in the corresponding time period, each of the plurality of ranges being a range corresponding to any of a plurality of storage areas in the storage device, the access number indicates the number of times each of the plurality of ranges is accessed;
   execute a first determining process that includes determining a correlation between a first range and a second range by using a first access vector and a second access vector, the first access vector being the access vector generated for the first range in the storage device and including a plurality of elements in a time order, the second access vector being the access vector generated for the second range in the storage device and including a plurality of elements in a time order, the first range and the second range being any of the plurality of ranges;
   execute a second determining process that includes determining, in accordance with the correlation between the first range and the second range, whether the first range is correlated with the second range; and
   execute a preloading process that includes preloading the second range in response to a command for accessing the first range when the first range is correlated with the second range; and
   the control device includes a processor configured to execute a second determining process that includes determining a range of data to be moved in storage hierarchy control in accordance with the correlation between the first range and the second range.

6. A non-transitory computer-readable storage medium for storing a program regarding event estimation, the program causing a processor to execute a process, the process comprising:
   executing a calculating process that includes generating a access vector for each of a plurality of ranges in the storage device, the access vector including a plurality of elements in a time order, each of the plurality of elements indicating an access number in a corresponding time period of a plurality of time periods or a variation of the access number in the corresponding time period, each of the plurality of ranges being a range corresponding to any of a plurality of storage areas in the storage device, the access number indicates the number of times each of the plurality of ranges is accessed;
   executing a determining process that includes determining a correlation between a first range and a second range by using a first access vector and a second access vector, the first access vector being the access vector generated for the first range in the storage device and including a plurality of elements in a time order, the second access vector being the access vector generated for the second range in the storage device and including a plurality of elements in a time order, the first range and the second range being any of the plurality of ranges;

executing a second determining process that includes determining, in accordance with the correlation between the first range and the second range, whether the first range is correlated with the second range; and executing a preloading process that includes preloading the second range in response to a command for accessing the first range when the first range is correlated with the second range.

* * * * *